US 6,688,959 B2

(12) United States Patent
Kasai et al.

(10) Patent No.: US 6,688,959 B2
(45) Date of Patent: Feb. 10, 2004

(54) METHOD AND APPARATUS FOR MANUFACTURING LINKED FOOD PRODUCTS HAVING TWISTED PORTIONS

(75) Inventors: Minoru Kasai, Kanagawa (JP); Minoru Nakamura, Kanagawa (JP)

(73) Assignee: Hitec Co., Ltd., Kanagawa (JP)

( * ) Notice: Subject to any disclaimer, the term of this patent is extended or adjusted under 35 U.S.C. 154(b) by 258 days.

(21) Appl. No.: 09/820,925

(22) Filed: Mar. 30, 2001

(65) Prior Publication Data

US 2001/0028906 A1 Oct. 11, 2001

(30) Foreign Application Priority Data

Mar. 31, 2000 (JP) .................... 2000-099866

(51) Int. Cl.$^7$ .................................................. A22C 7/00
(52) U.S. Cl. ................................................. 452/30
(58) Field of Search .............................. 452/51, 30, 35, 452/40, 31, 32

(56) References Cited

U.S. PATENT DOCUMENTS

| | | | |
|---|---|---|---|
| 5,092,813 A | | 3/1992 | Kasai |
| 5,199,921 A | * | 4/1993 | Townsend .................. 452/47 |
| 5,480,346 A | | 1/1996 | Kasai |
| 5,788,563 A | | 8/1998 | Nakamura |
| 6,056,635 A | * | 5/2000 | Vermeer et al. .............. 452/46 |
| 6,071,186 A | | 6/2000 | Shibata |
| 6,439,990 B1 | * | 8/2002 | Kasai et al. .................. 452/46 |

FOREIGN PATENT DOCUMENTS

| | | |
|---|---|---|
| CH | 466072 | 4/1964 |
| JP | 49-101577 | 9/1974 |
| JP | 2-286036 | 11/1990 |
| JP | 6-7073 | 1/1994 |
| JP | 6-178645 | 6/1994 |
| JP | 9-266753 | 10/1997 |
| JP | 11-100 | 1/1999 |
| JP | 00/99866 | 3/2000 |
| WO | WO 96/41539 | 12/1996 |
| WO | WO 00/65921 | 11/2000 |

* cited by examiner

Primary Examiner—Charles T. Jordan
Assistant Examiner—Susan C. Alimenti
(74) Attorney, Agent, or Firm—Kanesaka & Takeuchi

(57) ABSTRACT

An apparatus for manufacturing linked food products having twisted portions includes a stuffing nozzle for discharging from its distal end a food product material supplied from its material inlet port, a hollow spindle for rotating the stuffing nozzle, a braking member for engaging the casing on the stuffing nozzle; a main body housing having a front plate provided uprightly in such a manner as to extend in the same direction as a direction in which the stuffing nozzle extends from the material inlet port toward the distal end, and a side plate extending perpendicularly to the front plate, a spindle housing attached to the front plate, and a braking-member supporting member disposed at a position opposing the side plate.

34 Claims, 22 Drawing Sheets

METHOD AND APPARATUS FOR MANUFACTURING LINKED FOOD PRODUCTS HAVING TWISTED PORTIONS

BACKGROUND OF THE INVENTION

1. Field of the Invention

The present invention relates to a method and an apparatus for manufacturing linked food products having twisted portions such as sausages.

2. Description of the Related Art

As apparatuses of this type, two types of apparatuses are widely known conventionally, i.e., one which has a structure unsuitable for high-speed operation and is designed for using natural intestine casings and another which has a structure suitable for high-speed operation and is designed for using artificial casings. The natural-intestine-sausage manufacturing apparatus is required to be compact, and although known apparatuses satisfy the requirement, they are still unsuitable for high-speed operation. In addition, in recent years, there have been noticeable demands for the sanitation of the apparatus and the quality of sausages with respect to the manufacture of natural intestine sausages; however, it is difficult to say that the known apparatuses sufficiently meet these demands.

The aforementioned known apparatus include those disclosed in U.S. Pat. No. 5,480,346, U.S. Pat. No. 5,788,563, U.S. Pat. No. 6,071,186, and the like.

FIGS. 1 and 2 of U.S. Pat. No. 5,480,346 show an apparatus in which a housing incorporating a braking member is provided at a distal end portion of an elongated arm portion attached to an apparatus frame. With such an apparatus, since it is difficult to obtain perpendicularity between the apparatus frame and the arm portion, the relative positional accuracy of the braking member and a nozzle is low, so that such an apparatus is unsuitable for high-speed operation.

U.S. Pat. No. 5,480,346 discloses a sausage manufacturing apparatus comprising a raw-material supplying means for intermittently supplying a fixed amount of a material into a natural intestine casing and a pinching means for pinching the stuffed natural intestine casing by operating in synchronism with the intermittent supply of the material. With this apparatus, the quantity of the casing being pulled out from the stuffing nozzle by force of discharging the raw material is difficult to be made uniform, with the result that the stuffing degree of the sausage links (the tension of the sausages) is also difficult to be made uniform.

U.S. Pat. No. 5,788,563 (FIG. 10) discloses an apparatus in which a housing incorporating a spindle to which a nozzle is attached is provided in a vertical plane, and a high-load, high-vibration linking device is supported in opposing two horizontal planes. With this apparatus which requires these three reference planes (the vertical plane and the two horizontal planes) on a main body frame, the relative positional accuracy of the nozzle and the link linking device is low. Further, in this apparatus, since a metering pump is not disposed in the same plane as the vertical plane, the relative positional accuracy of the nozzle and the metering pump is low, so that this apparatus which has low relative positional accuracy is unsuitable for high-speed operation.

With the apparatus of U.S. Pat. No. 5,788,563, the sausage material is charged into a natural intestine casing which is moving with pincher members at a fixed speed. If the deviation of the diameter of the natural intestine casing is excessively large, sausages having differences in the stuffing degree of the sausage links (the tension of the sausages) are manufactured.

In the sausage manufacturing apparatus of U.S. Pat. No. 6,071,186, driving units for a metering pump, a chuck, and a linking means are disposed in a right-hand area within a frame, while a box accommodating inverters which are speed changing means for motors for the metering pump, the chuck, and the linking means is disposed in a left-hand area within the frame. Since this manufacturing apparatus has the right-hand area and the left-hand area, the frame is large in the horizontal direction.

U.S. Pat. No. 6,071,186 discloses an apparatus in which the metering pump, a housing for the chuck (braking member), and a housing for rotating a stuffing tube are disposed on an upper plate member of the frame, and lower portions of the housings are made open to allow the interiors of the housings to communicate with the interior of the frame. With this apparatus, there is possibility that water and the raw material may enter the interior of the frame and accumulate therein.

In addition, the known apparatuses further require a moving means which moves in a circular motion with the pincher members attached thereto as well as a conveying means which is disposed at a position downstream thereof and moves in a circular motion, so as to change the size of sausages. Such a known apparatus is disclosed in FIGS. 8 and 9 of International Laid-Open No. WO 96/41539. This known apparatus comprises the moving means to which the pincher members are attached and which moves in a circular motion, and the conveying means which is disposed at a position downstream thereof and moves in a circular motion. In this known apparatus, since the stuffed casing whose pinching has been released is moved at a fixed speed by the conveying means, the moving speed of the stuffed casing does not change. Accordingly, this known apparatus is hardly applicable to manufacturing natural intestine casing sausages having appropriate stuffing degrees by using natural intestine casings having large deviation in the diameter.

SUMMARY OF THE INVENTION

The present invention has been devised in view of the above-described aspects, and its objects are as follows:

1. To provide an apparatus for manufacturing linked food products having twisted portions such as sausages which is compact and particularly suitable for the manufacture of natural intestine sausages, and permits high-speed operation.
2. To provide an apparatus for manufacturing linked food products having twisted portions such as sausages which is compact and particularly suitable for the manufacture of natural intestine sausages, and permits high-speed operation and excels in sanitation.
3. To provide a method and a compact apparatus for manufacturing linked food products having twisted portions such as sausages which permit high-speed production of sausages having a fixed quantity and an appropriate stuffing degree by using a natural intestine casing having large deviation of the diameter.
4. To provide a method and a compact apparatus for manufacturing linked food products having twisted portions such as sausages which are particularly suitable for the manufacture of natural intestine sausages and make it possible to change the link length of sausages and the stuffed weight of the links.

To these ends, in accordance with one aspect of the invention, there is provided an apparatus for manufacturing linked food products having twisted portions such as sausages including a stuffing nozzle for discharging from its distal end a food product material supplied from its material inlet port and for forming a stuffed casing stuffed with the food product material, a hollow spindle for rotating the stuffing nozzle, and a braking member for engaging an outer surface of the casing on the stuffing nozzle, the apparatus comprising: a main body housing having a base plate extending in the same direction as a direction in which the stuffing nozzle extends from the material inlet port toward the distal end, and a side plate extending from a specific portion in the direction of the base plate in such a manner as to meet the base plate at an angle; a spindle housing attached to the base plate so as to rotatably support the hollow spindle; and a braking-member supporting member disposed at a position opposing the side plate so as to support the braking member at a predetermined position with respect to the stuffing nozzle, or a braking-member supporting member supported by the side plate so as to support the braking member at a predetermined position with respect to the stuffing nozzle. In this apparatus, since the braking-member supporting member is disposed at a position opposing the side plate of the main body housing, or since the braking-member supporting member is supported by the side plate, the relative positional accuracy of the braking-member supporting member and the stuffing nozzle is high.

The specific portion of the front wall, the base plate, or the front plate where the side wall or the side plate meets at an angle may be one edge of the front wall, the base plate, or the front plate, or may be a desired portion of the front wall, the base plate, or the front plate located at a position offset from the one edge toward the material inlet port of the stuffing nozzle. The specific portion can be determined on the basis of the desired rigidity of the main body housing and drainability from the one edge of the front wall, the base plate, or the front plate.

In accordance with another aspect of the invention, the apparatus comprises: the stuffing nozzle, the hollow spindle, and the main body housing which are mentioned above; a spindle housing attached to the base plate of the main body housing so as to rotatably support the hollow spindle; a metering pump to supply the food product material into the material inlet port of the stuffing nozzle; a motor disposed in an upper portion of an interior of the main body housing so as to rotatively drive the hollow spindle; a motor to drive the metering pump; and controlling means disposed in a lower portion of the interior of the main body housing so as to control at least one of the motors. Since the controlling means is disposed in the lower portion of the interior of the main body housing, the size (in the longitudinal direction of the stuffing nozzle) of the main body housing is made small. If the base plate of the main body housing is arranged to be upright, the size of the main body housing in the vertical direction is also made small.

In accordance with still another aspect of the invention, the apparatus comprises: the stuffing nozzle, the hollow spindle, and the braking member which are mentioned above; a main body housing having a front wall or a front plate having an angle of zero or less than 45 degrees with respect to a vertical plane and extending in the same direction as a direction in which the stuffing nozzle extends from the material inlet port toward the distal end, and a side wall or a side plate extending from one edge or a specific portion in the direction of the front wall or the front plate in such a manner as to meet the front wall or the front plate at an angle; a spindle housing attached to the front wall or the front plate so as to rotatably support the hollow spindle; a motor disposed in an interior of the main body housing so as to rotatively drive the hollow spindle; and a rotatively driving shaft disposed in the interior of the main body housing so as to rotate the braking member; the side wall or the side plate having a through hole formed therein about an axis of the rotatively driving shaft for rotating the braking member. In accordance with this apparatus, since the side wall or the side plate extends in such a manner as to meet the front wall or the front plate at an angle, the main body housing has large strength with respect to the load and the vibrational load. Since the spindle housing is attached to the front wall or the front plate which has an angle of zero or less than 45 degrees with respect to a vertical plane, it is possible to prevent the stagnation of the sausage material which leaked from the spindle or cleaning water, so that the apparatus is sanitary. Further, since the side wall or the side plate extends in such a manner as to meet the front wall or the front plate at an angle, the positional accuracy of the front wall or the front plate and the side wall or the side plate is high. Since a through hole is provided in the side wall or the side plate and is located on the axis of the rotatively driving shaft, the rotatively driving shaft can be disposed accurately with respect to the position of the spindle housing (stuffing nozzle). If an arrangement is provided such that a braking-member supporting member for supporting the braking member at a predetermined position with respect to the stuffing nozzle is disposed by being supported by the side wall or the side plate of the main body housing, the apparatus can be substantially made compact and simple.

In accordance with another aspect of the invention, the apparatus comprises: the stuffing nozzle, the hollow spindle, the spindle housing, and the main body housing having the base plate, which are mentioned above; linking means having a circulating member moving in a circular motion and provided with pincher member which move downstream of the distal end of the stuffing nozzle while pinching the stuffed casing; and a linking-means supporting member provided by being supported by the side plate of the main body housing so as to support the linking means at a predetermined position with respect to the stuffing nozzle. The linking-means supporting member is secured to the braking-member supporting member, or is attached to the side plate of the main body housing. If such an arrangement is provided, the apparatus can be substantially made compact and simple. This apparatus having the above-described linking means becomes an apparatus which is compact and permits high-speed linking.

In the present invention, the front wall may be formed by only the outer front plate portion serving as the front plate, and the side wall may be formed by only the outer side plate serving as the side plate. Further, the front wall and the side wall in the present invention suffice if they are members constituting walls, and are not limited to the front plate and the side plate. For example, the front wall and the side wall may be a front wall and a side wall formed by cast members molded with different shapes, respectively.

In accordance with a still another aspect of the invention, there is provided a method of manufacturing linked food products having twisted portions such as sausages, comprising the steps of: discharging a food product material from a distal end of a stuffing nozzle into a casing fitted over the stuffing nozzle so as to form a stuffed casing; pinching the stuffed casing by a pincher member which moves in a circular motion; and forming a twisted portion at a portion of the pinched stuffed casing while moving the pinched stuffed casing downstream of the distal end together with the pincher members, wherein after the pinching of the stuffed casing is released, ensuing pinching is effected after the lapse of a predetermined time.

The apparatus of the invention for implementing this method comprises: a stuffing nozzle for discharging from its distal end a food product material supplied from its material inlet port and for forming a stuffed casing stuffed with the food product material; and linking means which includes a circulating member having pincher members moving in a circular motion but moving straight in some areas, wherein ensuing pinching subsequent to one pinching of the stuffed casing by the pincher member is effected after release of the one pinching.

Since the pinching of the stuffed casing by the pincher member is suspended for a predetermined time, the moving speed of the stuffed casing during the suspension of pinching is variable without being restricted by the moving speed of the pincher member. If the food product material is discharged continuously from the stuffing nozzle into the casing in a state in which the pinching has been canceled, the stuffed casing moves at a slow moving speed if the diameter of the casing is large, and moves at a fast moving speed, to the contrary, if the diameter of the stuffed casing is small. As a result, it is possible to manufacture linked food products which have no creases and have appropriate stuffing degrees (tension of the stuffed casing) with no possibility of fractures.

In accordance with the construction provided with the circulating member and the pincher member in accordance with the present invention, since the pinching of the stuffed casing by the pincher member at two or more positions does not occur simultaneously, the pinching of the stuffed casing by the pincher member can be suspended for a predetermined period of time. Since the stuffed natural intestine casing is moved with the pincher member which moves in a circular motion including in an area in which the pincher member moves straighly, and the pinching by the pincher member is subsequently released, trouble in stuffing and twisting is difficult to occur. It should be noted that, in the present invention, the circulating movement including straight movement in the area includes movement in an elliptical locus and movement equivalent thereto. Since the area for the straight movement is shorter than the link length of the sausage, the circulating member can be made compact.

A force for moving the stuffed casing may be imparted to the stuffed casing the pinching of which by the pincher members has been released, by a stuffed-casing holding means secured to the circulating member. Such a method also belongs to the method of moving the stuffed casing by the discharge pressure.

The present invention is optimally suited to the manufacture of sausages using natural intestine casings, such as hog intestine casings or sheep intestine casings; however, the present invention is not necessarily limited to the same, and may be applicable to the manufacture of sausages using artificial casings, such as cellulose casings or collagen casings.

The above and other objects, features and advantages of the present invention will become more apparent from the following detailed description of the invention when read in conjunction with the accompanying drawings.

DESCRIPTION OF THE PREFERRED EMBODIMENTS

Figure 1:
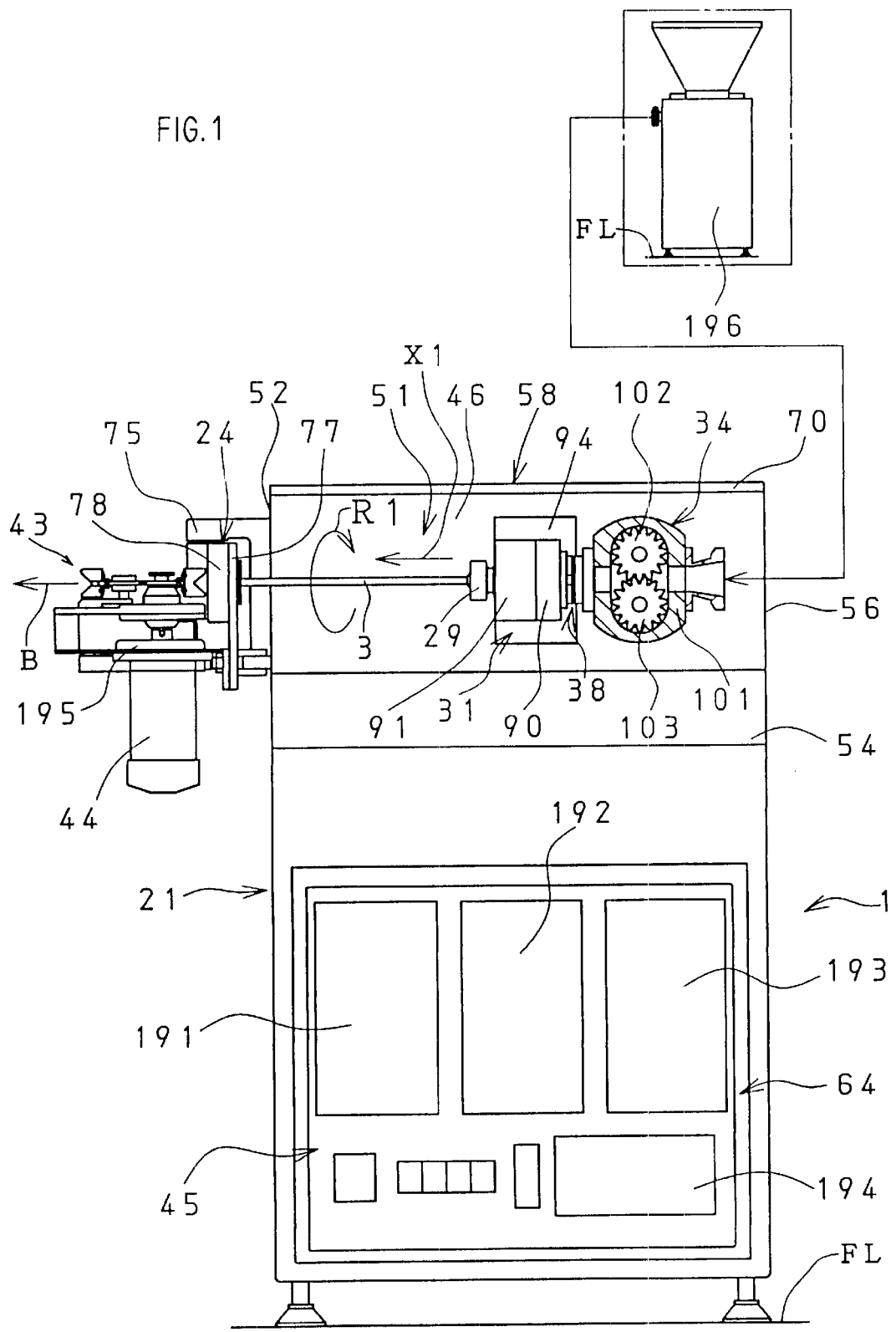
FIG. 1 is an explanatory front elevational view of a preferred embodiment of the invention.

Referring to the accompanying drawings, a detailed description will be given of the preferred embodiments of the invention. It should be noted, however, that the invention is not limited to these embodiments.

FIGS. 1 to 13 show an apparatus 1 for manufacturing linked food products having twisted portions such as sausages in accordance with this embodiment. In FIGS. 1–4 and 7, the apparatus 1 comprises a stuffing nozzle 3 which, while being rotated in the direction of R1 about an axis 2, discharges a raw material of a food product, i.e., a ground meat 7 in this embodiment, which has been supplied into its interior 6 through a material inlet port 5 at its one end face 4, into a natural intestine casing 10 serving as a casing continuously from a material discharge port 9 at a distal end 8 of the stuffing nozzle 3 so as to form a stuffed natural intestine casing 11 serving as a stuffed casing stuffed with the ground meat 7, as well as a linking means 43 for moving the stuffed natural intestine casing 11 downstream (in the direction of arrow B) of the distal end 8 while pinching the stuffed natural intestine casing 11 and causing a twisted portion 12 to be formed therein.

In FIGS. 1, 4, 7, and 8, the manufacturing apparatus 1 further comprises the following: a main body housing 21; a braking-member supporting member 24 which is attached to the main body housing 21 in such a manner as to be rotatable in the direction of R2 about an axis 23 through a hinge mechanism 22; a braking member 26 which is formed of an annular elastic member such as rubber and through which the stuffing nozzle 3 is inserted so as to apply a brake to the movement of the natural intestine casing 10 serving as a non-stuffed casing in the direction of X1 along the axis 2 as an inner peripheral edge 25 of the braking member 26 is brought into contact with an outer peripheral surface 10A of the natural intestine casing 10 fitted over the stuffing nozzle 3; a hollow spindle 30 whose one end face 28 side is coupled to the one end face 4 side of the stuffing nozzle 3 through a coupling member 29 so that its hollow portion 27 communicates with the interior 6 of the stuffing nozzle 3; a spindle housing 31 for supporting the hollow spindle 30 rotatably in the direction of R1.

Figure 8:
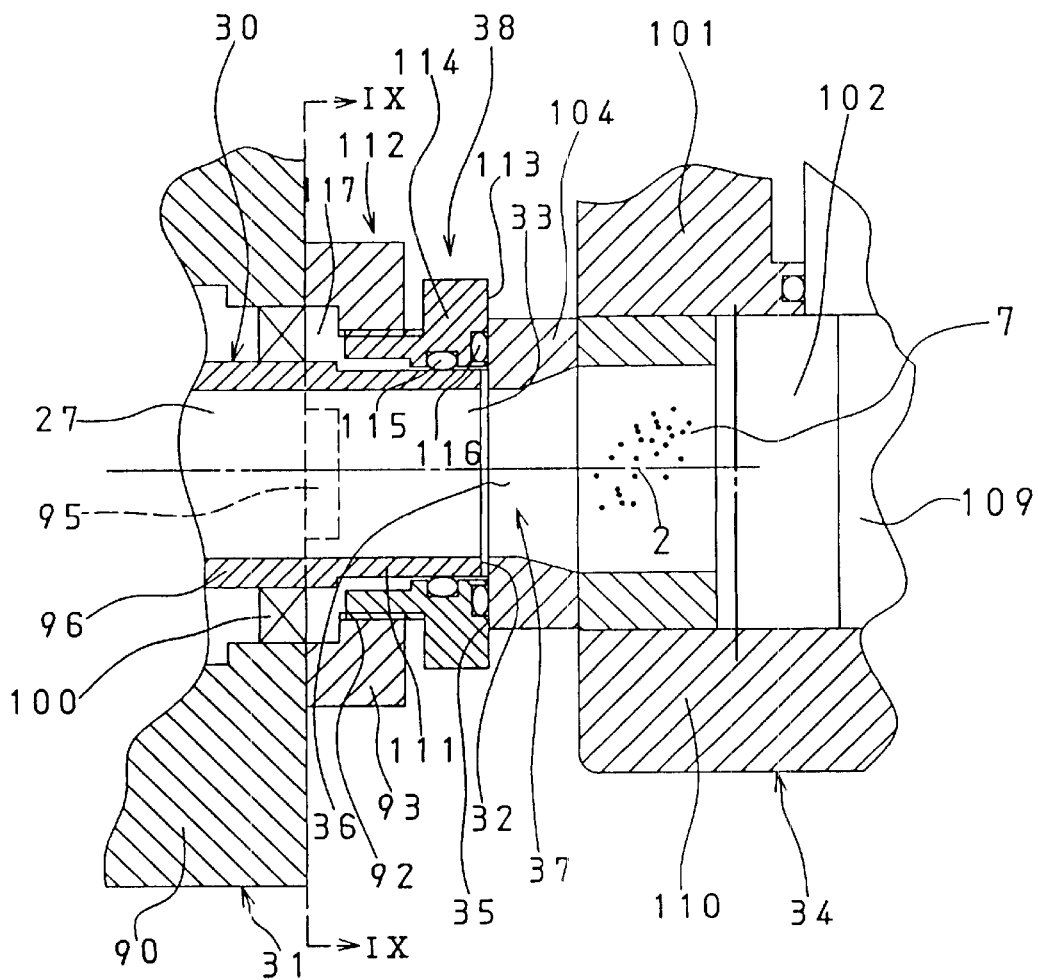
FIG. 8 is an explanatory plan view, partly in section, of the embodiment shown in FIG. 1.

In FIG. 8, the apparatus 1 comprises a metering pump 34 for supplying the ground meat 7 into a material inlet port 33 at the other end face 32 of the hollow spindle 30; a material-leakage preventing means 38 which is disposed around a coupling position 37 for coupling a material supplying port 36 at one end face 35 of a material-supplying-port member 104 secured to the metering pump 34 and the material inlet port 33 at the other end face 32 of the hollow spindle 30, so as to prevent the leakage of the ground meat 7 to the outside from the coupling position 37; an electric motor 39 serving as a rotatively driving source for generating a rotatively driving force for periodically rotating the hollow spindle 30 and the braking member 26 in the direction of R1; a transmitting mechanism 40 for transmitting the rotatively driving force of the electric motor 39 to the hollow spindle 30 and the braking member 26; an electric motor 41 serving as a rotatively driving source for generating a rotatively driving force for driving the metering pump 34; a transmitting mechanism 42 for transmitting the rotatively driving force of the electric motor 41 to the metering pump 34; and a controlling means 45 for controlling the electric motors 39 and 41 and an electric motor 44 of the linking means 43.

In FIGS. 1, 2, 4, and 7, the main body housing 21 has the following: an upper flat front wall 51 disposed vertically in this embodiment and having a continuous flat outer surface 46 extending in the same direction X1 as that in which the stuffing nozzle 3 extends from its material inlet port 5 toward its distal end 8; a flat side wall 53 disposed vertically and having a continuous flat outer surface 47 which continues integrally from one end 52 serving as a specific portion in the aforementioned direction X1 of the front wall 51, and extends in a direction of meeting at an angle the front wall 51, i.e., in a direction perpendicular to the front wall 51 in this embodiment; an intermediate inclined front wall 54 which continues integrally from the front wall 51 and is inclined; a lower front wall 55 continuing integrally from the intermediate inclined front wall 54 and disposed vertically; a side wall 57 disposed vertically and continuing integrally from the other end 56 in the aforementioned direction of the front wall 51, and extending in a direction of meeting at an angle the front wall 51, i.e., in a direction perpendicular to the front wall in this embodiment; an upper wall 58; a lower wall 59; a rear wall 60; an intermediate inner board 63 supported by the side walls 53 and 57 so as to partition the interior 21Z of the main body housing 21 into an upper portion 61 and a lower portion 62; and a control box 64 disposed at a lower position of the intermediate inner board 63 and mounted on the lower wall 59.

Figure 4:
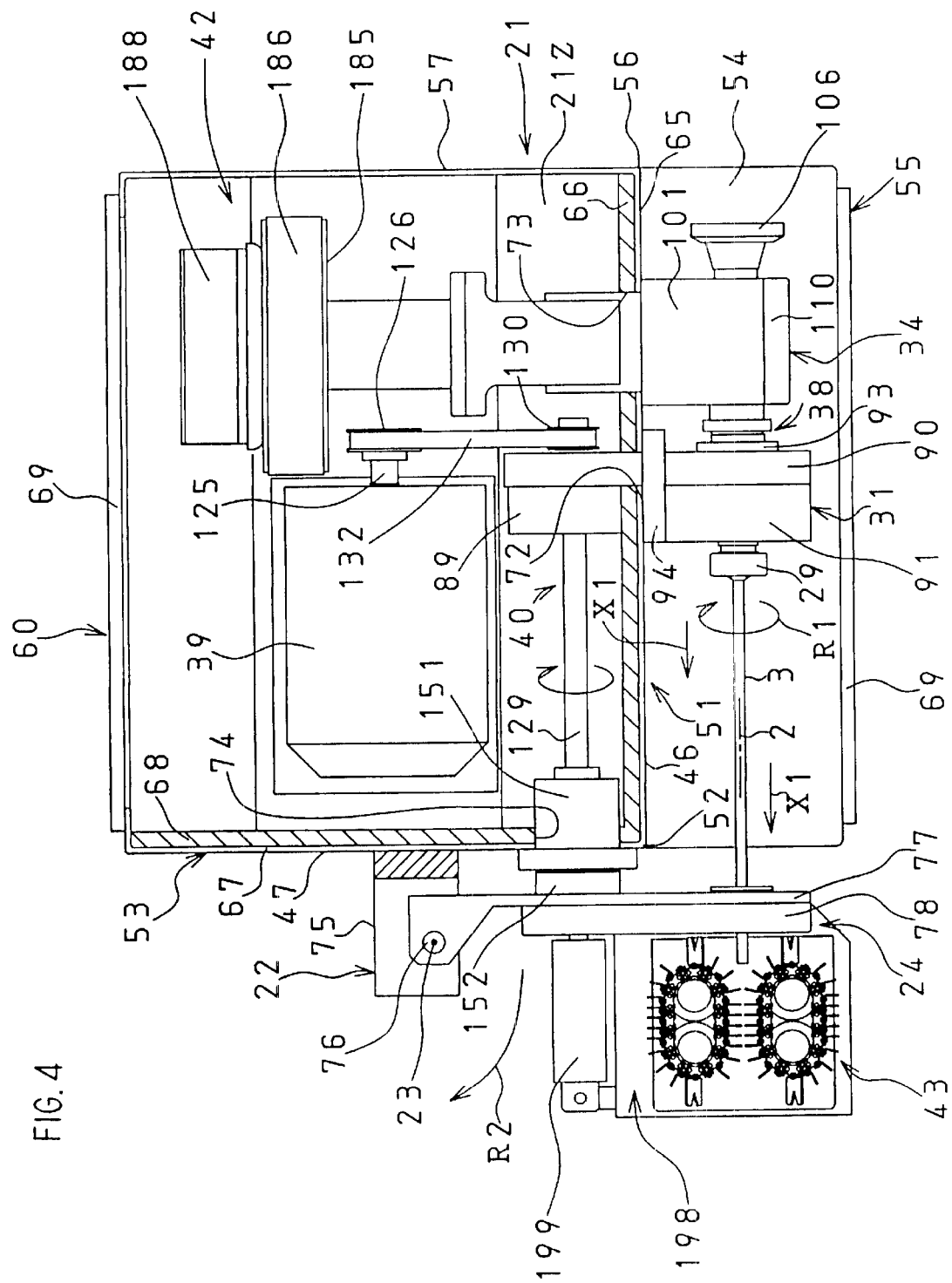
FIG. 4 is an explanatory plan view of the embodiment shown in FIG. 1.
Figure 5:
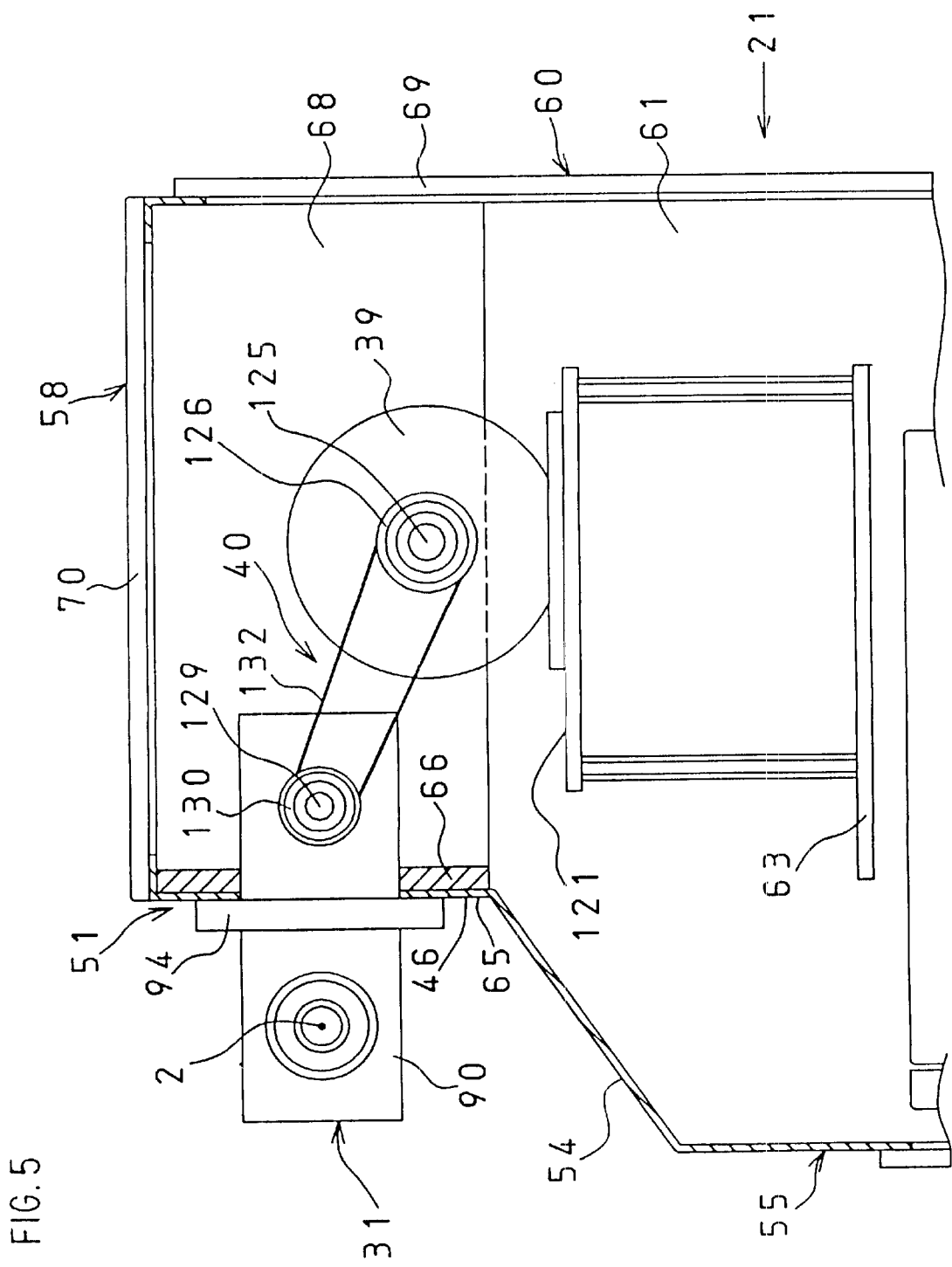
FIG. 5 is an explanatory view of an upper portion of one side of the embodiment shown in FIG. 1.
Figure 6:
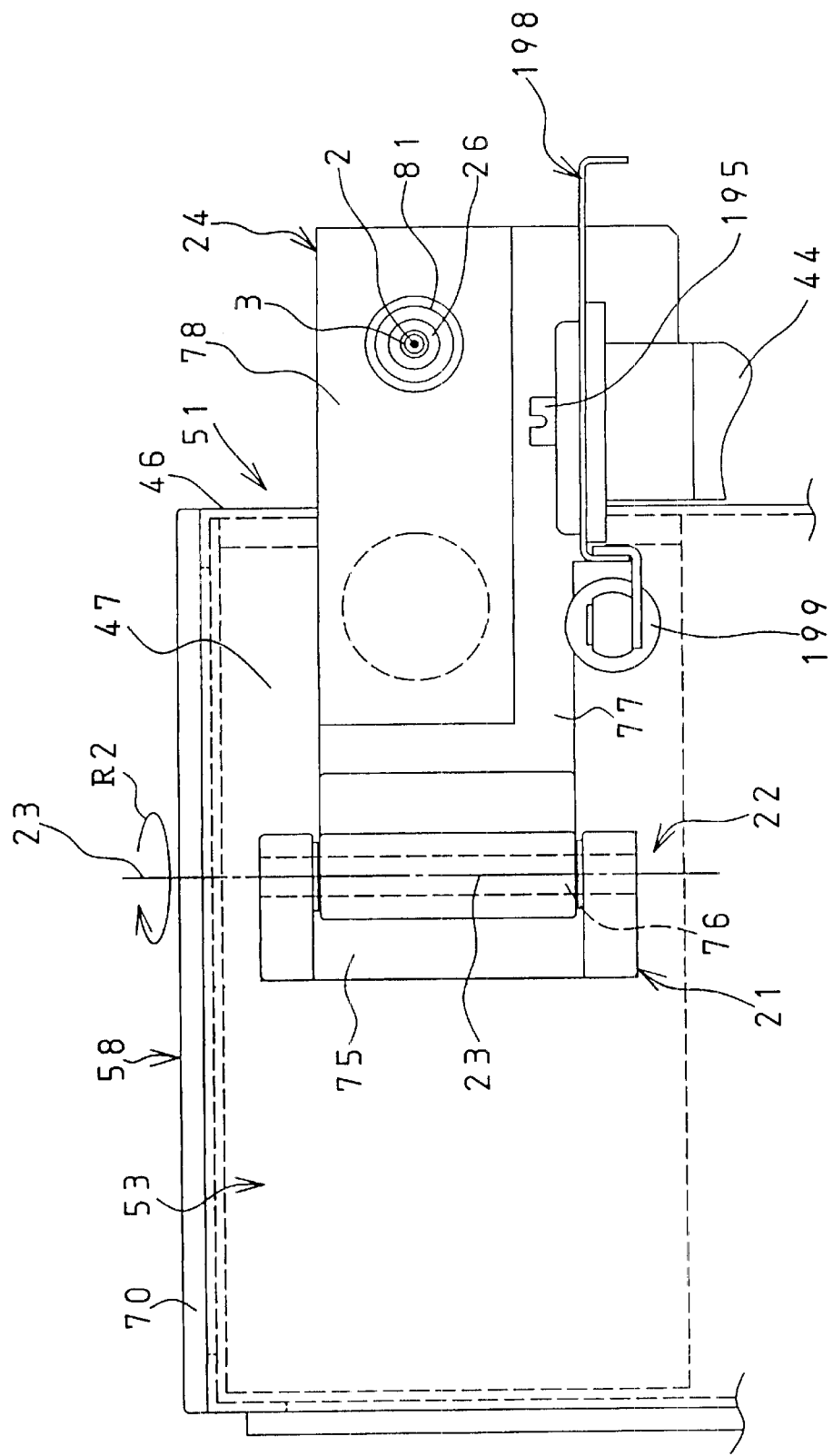
FIG. 6 is an explanatory view of an upper portion of the other side of the embodiment shown in FIG. 1.

In FIGS. 4 and 5, the front wall 51 comprises an outer front plate portion 65 serving as a base plate for forming the flat outer surface 46 and a thick reinforcing front plate 66 which is tightly laminated on or joined to the inner surface of the outer front plate portion 65 so as to reinforce the outer front plate portion 65. The side wall 53 comprises an outer side plate 67 serving as a side plate for forming the flat outer surface 47 and a thick reinforcing side plate 68 which is tightly laminated on or joined to the inner surface of an upper portion of the outer side plate 67 so as to reinforce the outer side plate 67. The front wall 55, the upper wall 58, and the rear wall 60 are respectively provided with a front cover plate 69, an upper cover plate 70, and a rear cover plate 71 which are detachable. In the front wall 51, through holes 72 and 73 are formed in the outer front plate portion 65 and the thick reinforcing front plate 66, while in the side wall 53 a through hole 74 is formed in the outer side plate 67 and the thick reinforcing side plate 68.

In FIGS. 4, 6, 7, and 10, the hinge mechanism 22 has a bearing member 75 fixed to the outer side plate 67 of the side wall 53 and a shaft 76 attached rotatably to the bearing member 75. The braking-member supporting member 24 has a plate member 77 secured integrally to the shaft 76 and a cover 78 secured to the plate member 77, and is attached to the outer side plate 67 of the side wall 53 by being supported rotatably in the direction of R2 through the hinge mechanism 22. Through holes 79 and 80 are formed in the plate member 77, while a through hole 81 is formed in the cover 78 in face-to-face relation to the through hole 80. In the braking-member supporting member 24, the distal end 8 of the stuffing nozzle 3 passes through the through holes 80 and 81.

Figure 7:
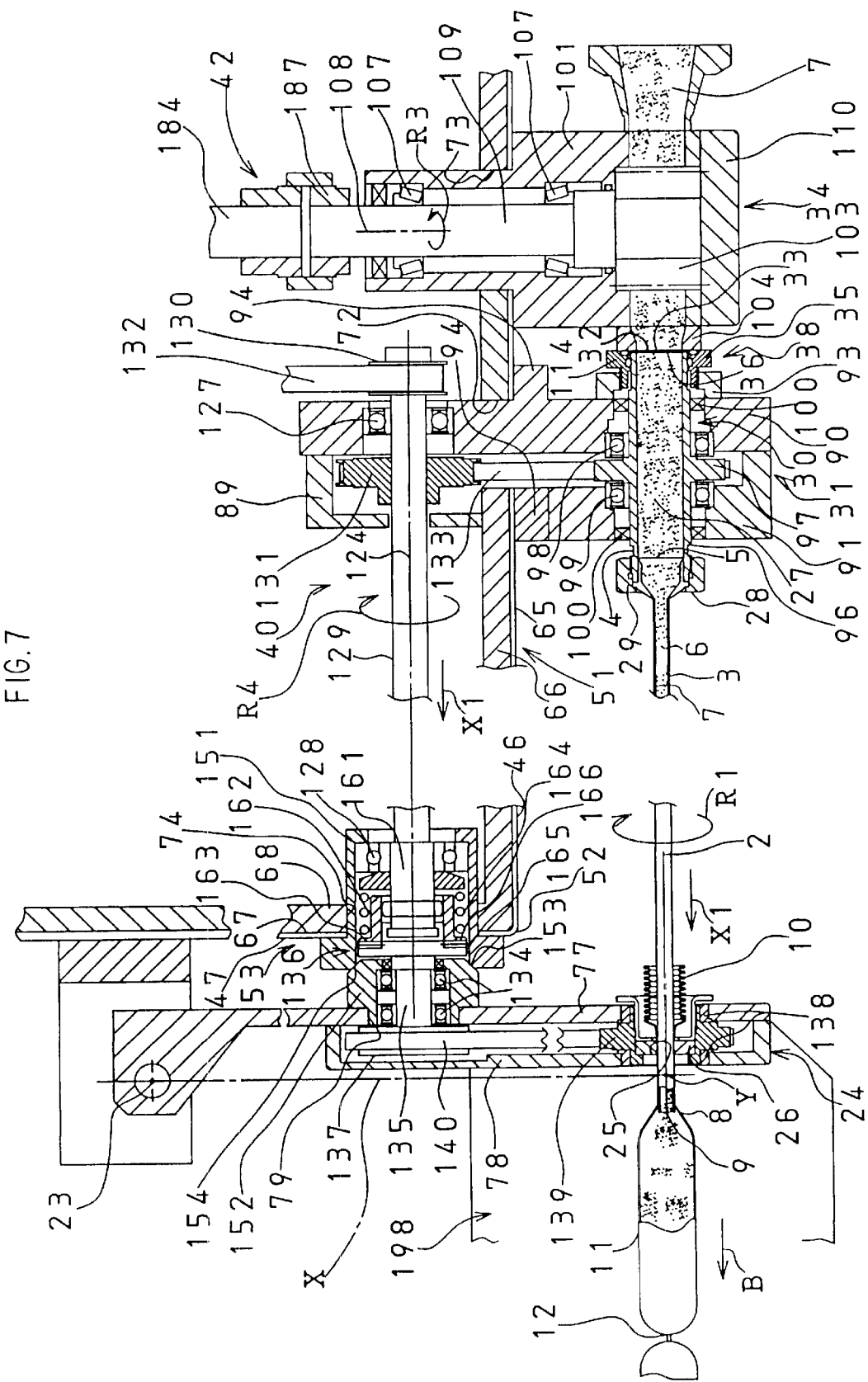
FIG. 7 is an explanatory cross-sectional plan view of the embodiment shown in FIG. 1.

In FIG. 7, the axis 23, which is the rotatable center of the braking-member supporting member 24 to which the braking member 26 is attached, is disposed such that a point of intersection Y between the axis 2 and a line X which is perpendicular to the axis 2 and passes the axis 23 is located between the material discharge port 9 and the braking member 26. If this arrangement is provided, even if the distance from the material discharge port 9 of the stuffing nozzle 3 to the braking member 26 is long as shown in this embodiment, in the rotation of the braking-member supporting member 24 in the direction of R2 (FIG. 4), the braking member 26 located at the position shown in FIG. 7 can be easily moved on the stuffing nozzle 3 forwardly of the material discharge port 9. Reference numeral 199 denotes an air cylinder for rotating the braking-member supporting member 24 about the axis 23.

The spindle housing 31 provided on the front wall 51 has a spindle housing body 90 which is fitted and positioned in the through hole 72, projects on one side forwardly from the outer front plate portion 65, and projects on the other side into the main body housing 21; a cover 91 disposed outside the main body housing 21 and secured to the spindle housing body 90; and a cover 89 disposed in the main body housing 21 and secured to the spindle housing body 90. A seat 94 of the spindle housing body 90 is fixed in close contact with the outer front plate portion 65 of the front wall 51.

In FIG. 7, the hollow spindle 30 has a hollow cylindrical portion 96 and a toothed pulley portion 97 formed integrally with the hollow cylindrical portion 96, and is supported by the spindle housing body 90 and the cover 91 through bearings 98 and 99 inside the hollow cylindrical portion 96 so as to be rotatable in the direction of R1. Annular seal members 100 are respectively fitted between the spindle housing body 90 and the hollow spindle 30 and between the cover 91 and the hollow spindle 30 with the bearings 98 and 99 placed therebetween.

In FIGS. 1, 7, and 8, the metering pump 34 is provided on the outer front plate portion 65 of the front wall 51 such that it is fitted and positioned in the through hole 73, has on one side a cover 110 and projects forwardly from the outer front plate portion 65, and has on the other side the following: a pump housing 101 projecting into the main body housing 21; gears 102 and 103 supported rotatably inside the pump housing 101 and meshing with each other; a material-supplying-port member 104 secured to the pump housing 101 and for forming the material supplying port 36 at the one end face 35; and a rotating shaft 109 to which the gear 103 is secured and which is supported in the pump housing 101 through a bearing 107 so as to be rotatable in the direction of R3 about axis 108. The metering pump 34 is adapted to measure the ground meat 7 pressure-fed from a stuffing pump 196 and supply it into the material inlet port 33 at the other end 32 of the hollow spindle 30 from the material supplying port 36 through the material-supplying-port member 104 as the rotating gears 102 and 103 rotate on the basis of the rotation of the rotating shaft 109 in the direction of R3.

Figure 9:
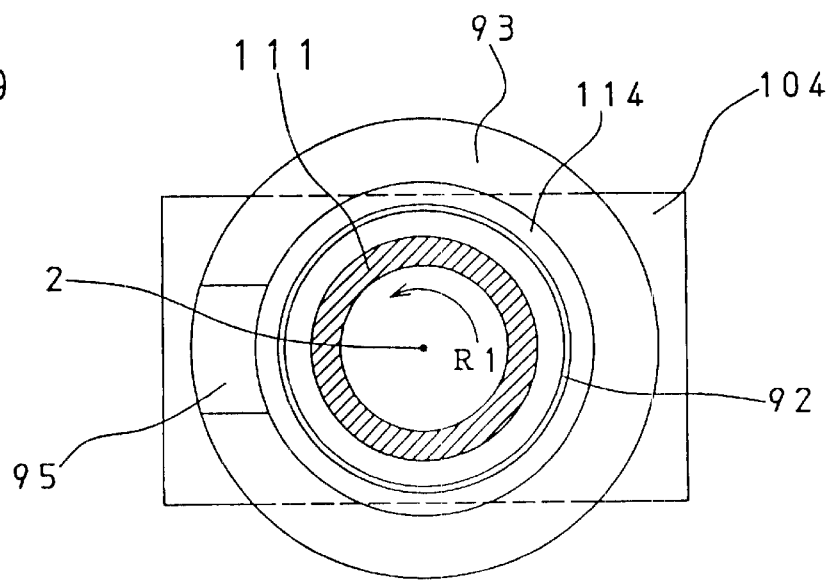
FIG. 9 is an explanatory cross-sectional view taken along line IX—IX shown in FIG. 8.

In FIGS. 8 and 9, the material-leakage preventing means 38 has a tubular member 114 in which another end portion 111 of the hollow spindle 30 is inserted and whose annular one end face 113 presses on and contacts with the one end face 35 around the material supplying port 36; an annular seal member 115 disposed between the inner peripheral surface of the tubular member 114 and the outer peripheral surface of the other end portion 111 of the hollow spindle 30; a pressing means 112 for promoting the pressing and contacting of the annular one end face 113 of the tubular member 114 with respect to the one end face 35 around the material supplying port 36; and an annular seal member 116 disposed between the one end face 35 and the annular one end face 113. In this material-leakage preventing means 38, since the annular seal member 116 is provided, there may be a slight interval between the one end face 35 and the annular one end face 113.

In this embodiment, the annular seal member 115 is fitted to the inner peripheral surface of the tubular member 114 so as to be slidably brought into contact with the outer surface of the other end portion 111 of the hollow spindle 30, while the annular seal member 116 is fitted to the annular one end face 113 of the tubular member 114 so as to press on and contact with the one end face 35 of the material-supplying-port member 104. It should be noted that in a case where the material-leakage preventing means 38 is formed by omitting the annular seal member 116, the annular one end face 113 is made to press on and contact with the one end face 35.

The pressing means 112 has a nut member 93 having a notch 95 and adapted to abut against the spindle housing body 90, and a threaded portion 92 formed on an inner peripheral surface of the nut member 93 and meshing with a threaded portion 92 formed on an outer peripheral surface of the tubular member 114.

Prior to the starting of the operation of the apparatus, the tubular member 114 is moved toward the material-supplying-port member 104 by rotating the tubular member 114 in the direction of R1 with respect to the nut member 93 so as to press and contact the annular one end face 113 of the tubular member 114 against the one end face 35 of the material-supplying-port member 104, thereby creating a hermetically sealed state. On the threaded portion 92, since threads in such a threaded direction as to produce the aforementioned movement of the tubular member 114 toward the material-supplying-port member 104 are formed, so that even if the hollow spindle 30 rotates during the operation of the apparatus, no loosening occurs in the threaded portion 92. The material-supplying-port member 104 is detachably mounted on the pump housing 101. When the tubular member 114 and the nut member 93 are removed from the hollow spindle 30 to clean the apparatus 1, if the material-supplying-port member 104 is removed from the pump housing 101, it is unnecessary to remove the pump housing 101 from the outer front plate portion 65. An arrangement may be provided such that the pump housing 101 also serves as the material-supplying-port member 104. In this case, after the pump housing 101 is removed from the outer front plate portion 65, the tubular member 114 and the nut member 93 are removed from the hollow spindle 30.

The arrangement is provided such that the ground meat 7, which has leaked into an annular space 117 inside the nut member 93 after passing between the annular seal member 115 and an outer surface of the other end portion 111 of the hollow spindle 30, is adapted to pass through the notch 95 and to be discharged to the outside. Accordingly, the deterioration of the annular seal member 115 can be detected by the leakage of the ground meat 7.

In addition, with the apparatus 1, since the unrotated tubular member 114 into which the other end portion 111 of the hollow spindle 30 is inserted is pressed against the unrotated material-supplying-port member 104 to prevent the leakage of the raw material, the hermetic sealing accuracy is high, and disassembling and reassembling at the time of cleaning are made simple.

It should be noted that if a hermetically sealed state is created by causing the inner peripheral surface of the tubular member 114 to directly slide on the outer peripheral surface of the other end portion 111 of the hollow spindle 30, the annular seal member 115 disposed between the inner peripheral surface of the tubular member 114 and the outer peripheral surface of the other end portion 111 may be omitted.

Figure 2:
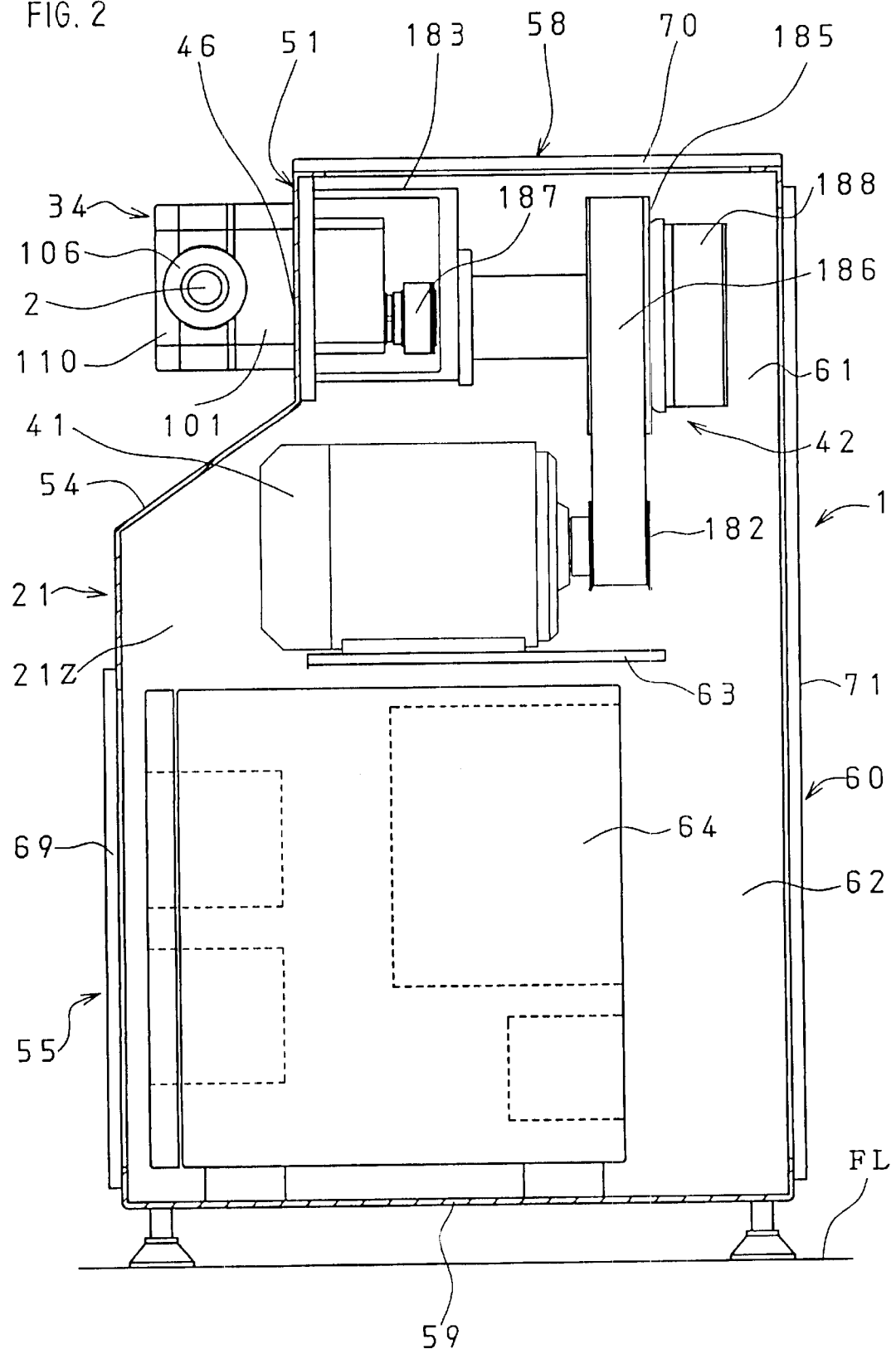
FIG. 2 is an explanatory view of one side of the embodiment shown in FIG. 1.
Figure 3:
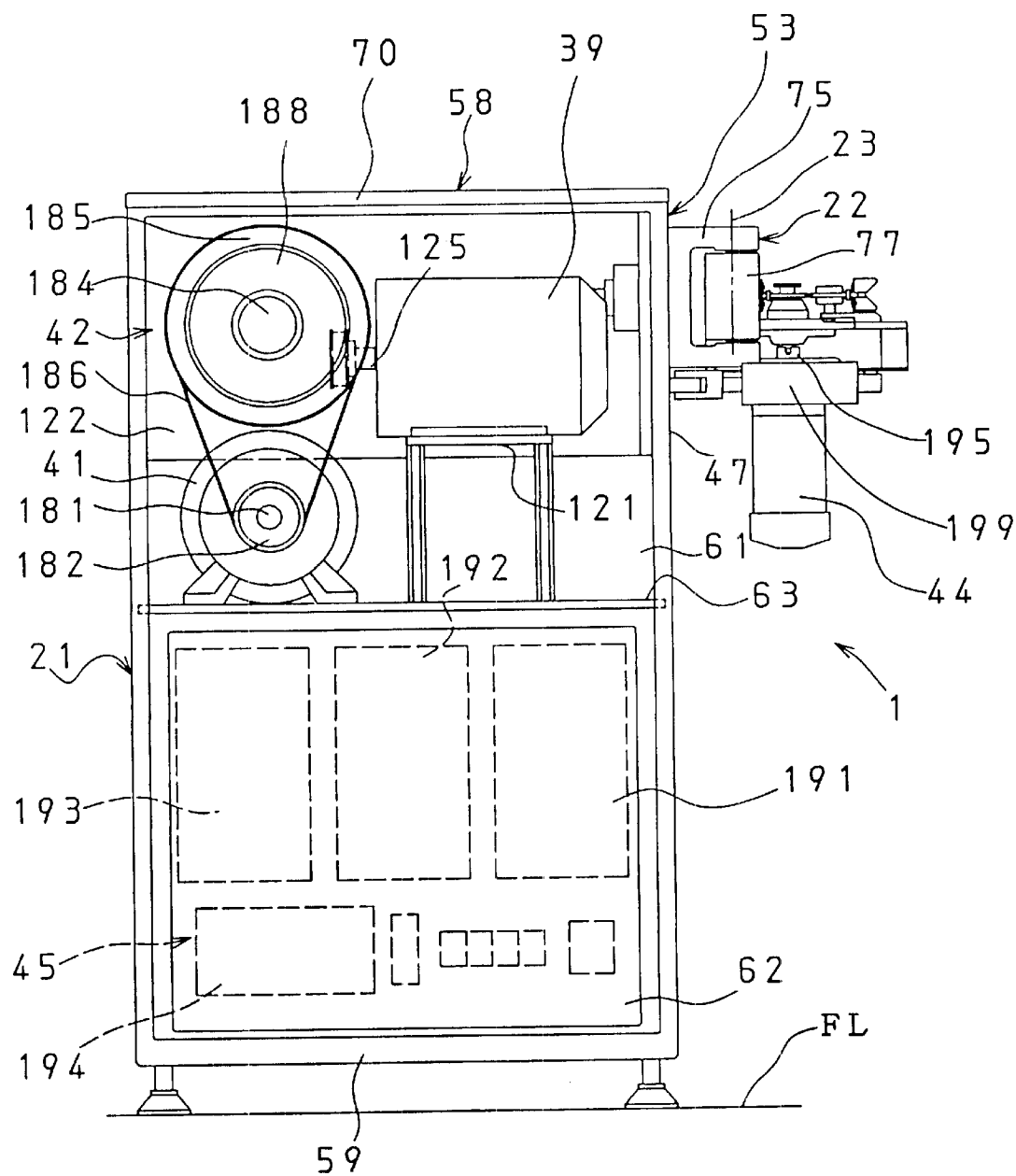
FIG. 3 is an explanatory rear view of the embodiment shown in FIG. 1.

In FIGS. 2, 3, and 5, the electric motor 39 provided in the main body housing 21 is installed by being mounted on a supporting base 121 formed on the intermediate inner board 63, and is accommodated in the upper portion 61 of the main body housing 21. Similarly, the electric motor 41 provided in the main body housing 21 is installed by being mounted directly on the intermediate inner board 63, and is accommodated in the upper portion 61 of the main body housing 21.

Figure 10:
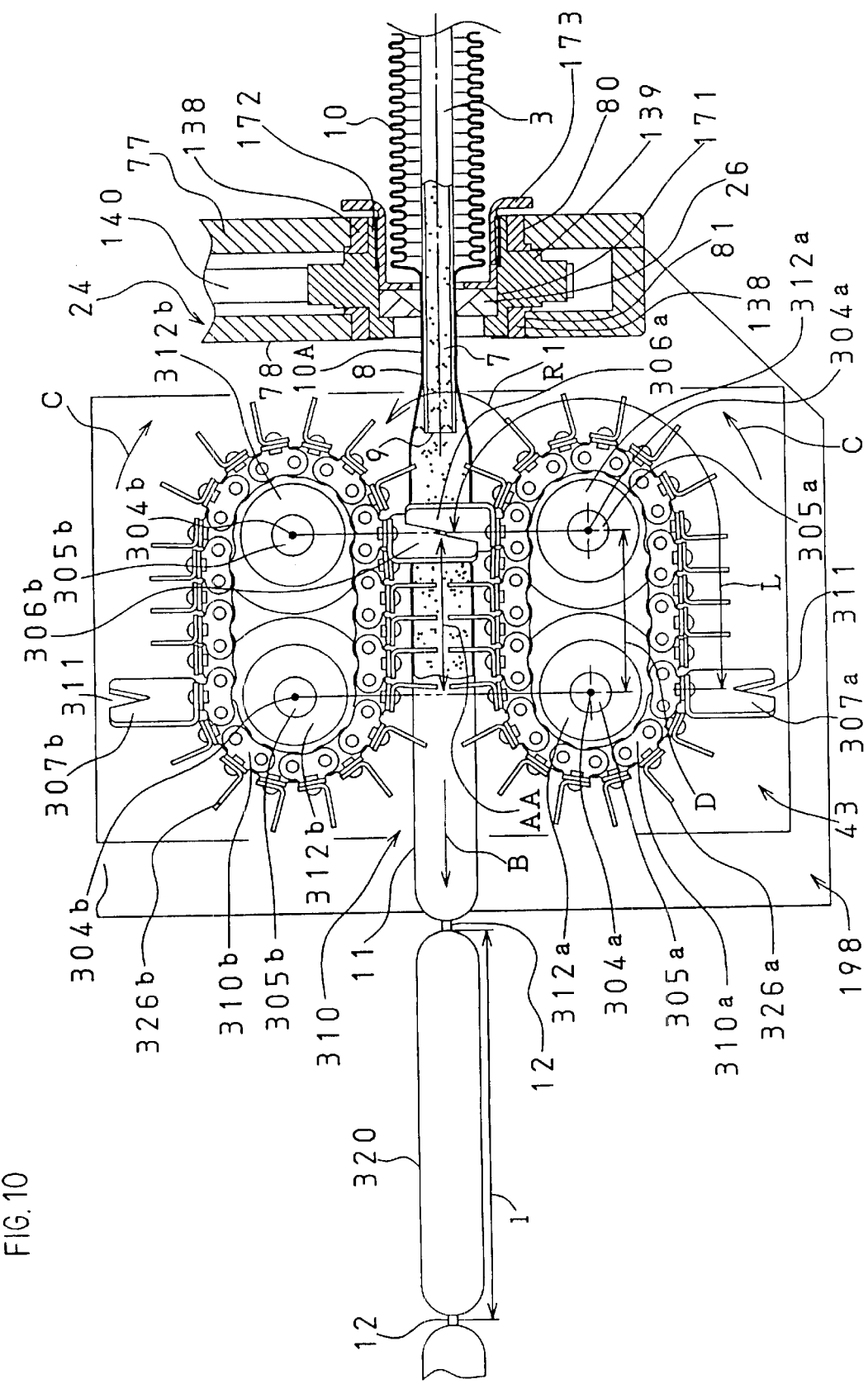
FIG. 10 is an explanatory plan view of a linking means of the embodiment shown in FIG. 1.

In FIGS. 4, 5, and 7, the transmitting mechanism 40 comprises the following: a toothed pulley 126 attached to an output rotating shaft 125 of the electric motor 39; a rotatively driving shaft 129 which is passed through the cover 89 and is supported on one end side by the spindle housing body 90 through a bearing 127 and is supported on the other end side by the outer side plate 67 of the side wall 53 through a bearing 128 so as to be rotatable in the direction of R4 about an axis 124, the rotatively driving shaft 129 being adapted to rotate the braking member 26 in the direction of R1 from its outer peripheral edge side 171 shown in FIG. 10 and to rotate the hollow spindle 30 in the same direction in synchronism with the rotation of the braking member 26; toothed pulleys 130 and 131 attached to the rotatively driving shaft 129; a timing belt 132 wound around and trained between the pulleys 126 and 130; a timing belt 133 which is wound around and trained between the pulley 131 and the pulley portion 97 and is stretched so as to pass through the through hole 72 and extend in a substantially horizontal direction; a rotating shaft 135 supported rotatably by the plate member 77 through a bearing 134; a clutch mechanism 136 which when the braking-member supporting member 24 is disposed at the position shown in FIG. 7, transmits the rotation of the rotatively driving shaft 129 to the rotating shaft 135, and which when the braking-member supporting member 24 has been rotated in the direction of R2 shown in FIG. 4, cancels the transmission of the rotation of the rotatively driving shaft 129 to the rotating shaft 135; a tooted pulley 137 attached to the rotating shaft 135; a toothed hollow pulley 139 supported rotatably by the braking-member supporting member 24 through a bearing 138; and a timing belt 140 wound around and trained between the pulleys 137 and 139.

In FIG. 7, the bearing 128 is accommodated in a bearing case 151 fitted in the through hole 74 on the axis 124 of the rotatively driving shaft 129. Accordingly, in this embodiment, the bearing 128 for supporting the rotatively driving shaft 129 is disposed via the bearing case 151 inside the through hole 74 formed in the side wall 53 of the main body housing 21. The bearing 134 is accommodated in a bearing case 152 fitted in the through hole 79, and the bearing case 152 has a tapered surface 153 on its open end side. Also, the bearing case 151 has on its open end side a tapered surface 154 of a shape complementary to the tapered surface 153.

The clutch mechanism 136 has a clutch plate portion 163, a coil spring 164, and a clutch plate 165, and the clutch plate portion 163 and the clutch plate 165 have clutch surfaces 166 which mesh with each other.

In FIGS. 4 and 7, when the clutch surfaces 166 are engaged with each other in the rotation of the braking-member supporting member 24, the bearing case 151 and the bearing case 152 are adapted to be fitted at their tapered surfaces 153 and 154. Accordingly, the alignment of the rotatively driving shaft 129 and the rotating shaft 135 can be effected, and since the plate member 77 can be supported by the fitting of the tapered surfaces 152 and 154 in addition to the hinge mechanism 22, it is possible to prevent the vibration and positional offset of the braking-member supporting member 24.

In FIG. 10, the braking member 26 is attached to a hollow shaft portion 172 of the pulley 139 by means of a pressing member 173 in a state in which its outer peripheral portion 171 is in contact with the inner peripheral surface of the hollow shaft portion 172, and is rotatively driven by the pulley 139.

In FIGS. 4 and 7, the timing belt 133 is adapted to transmit the rotatively driving force from the electric motor 39 serving as a rotatively driving source provided in the interior 21Z of the main body housing 21 to the hollow spindle 30, so as to rotate the hollow spindle 30 in the direction of R1.

In FIGS. 2–4 and 7, the transmitting mechanism 42 has the following: a toothed pulley 182 attached to an output rotating shaft 181 of the electric motor 41; a rotating shaft 184 supported rotatably by the front wall 51 through a bracket 183; a toothed pulley 185 attached to the rotating shaft 184; a timing belt 186 wound around and trained between the toothed pulleys 182 and 185; a coupling member 187 for coupling the rotating shaft 184 to the rotating shaft 109; and a clutch 188. The transmitting mechanism 42 is adapted to transmit the rotation of the output rotating shaft 181 of the electric motor 41 to the rotating shaft 109 to rotate the rotating gears 102 and 103 of the metering pump 34.

In FIG. 7, the stuffing nozzle 3, to the material inlet port 5 of which the ground meat 7 is supplied [to its material inlet port 5] from the metering pump 34 through the hollow spindle 30 and over which the natural intestine casing 10 is fitted, is adapted to continuously discharge the ground meat 7 from the material discharge port 9 at the distal end 8 into the natural intestine casing 10 so as to form the stuffed natural intestine casing 11 forwardly of the material discharge port 9, and to be rotated in the [same] direction of R1 by the rotation of the hollow spindle 30 in the direction of R1 so as to rotate the stuffed natural intestine casing 11 in the direction of R1 through the fitted natural intestine casing 10.

In FIGS. 1 and 2, the controlling means 45, which is disposed inside the control box 64 in the lower portion 62 of interior 21Z of the main body housing 21, has inverters 191, 192, and 193 for the electric motors 39, 41, and 44 and a sequencer (programmable controller) 194 for controlling these inverters 191, 192, and 193. The controlling means 45 controls the inverters 191, 192, and 193 on the basis of control signals from the sequencer 194 to control the rotational speeds of the output rotating shafts 125, 181, and 195 of the electric motors 39, 41, and 44.

Since the controlling means 45 is accommodated in the control box 64, even if dew condensation occurs in its interior 21Z, the controlling means 45 is shut off from the dew condensation.

It should be noted that, in the present invention, not only the electric motor but also a hydraulic motor may be used as the motor. The controlling means may be a controlling means for controlling the hydraulic motor.

Although, in the above-described embodiment, a description has been given of the example in which all of the three inverters, including the inverter for the motor for rotatively driving the hollow spindle, the inverter for the motor for driving the metering pump, and the inverter for the motor for driving the link forming means, are disposed in the lower portion 62 of the main body housing 45, in the present invention at least one of the inverters may be disposed in the lower portion of the main body housing.

Figure 11:
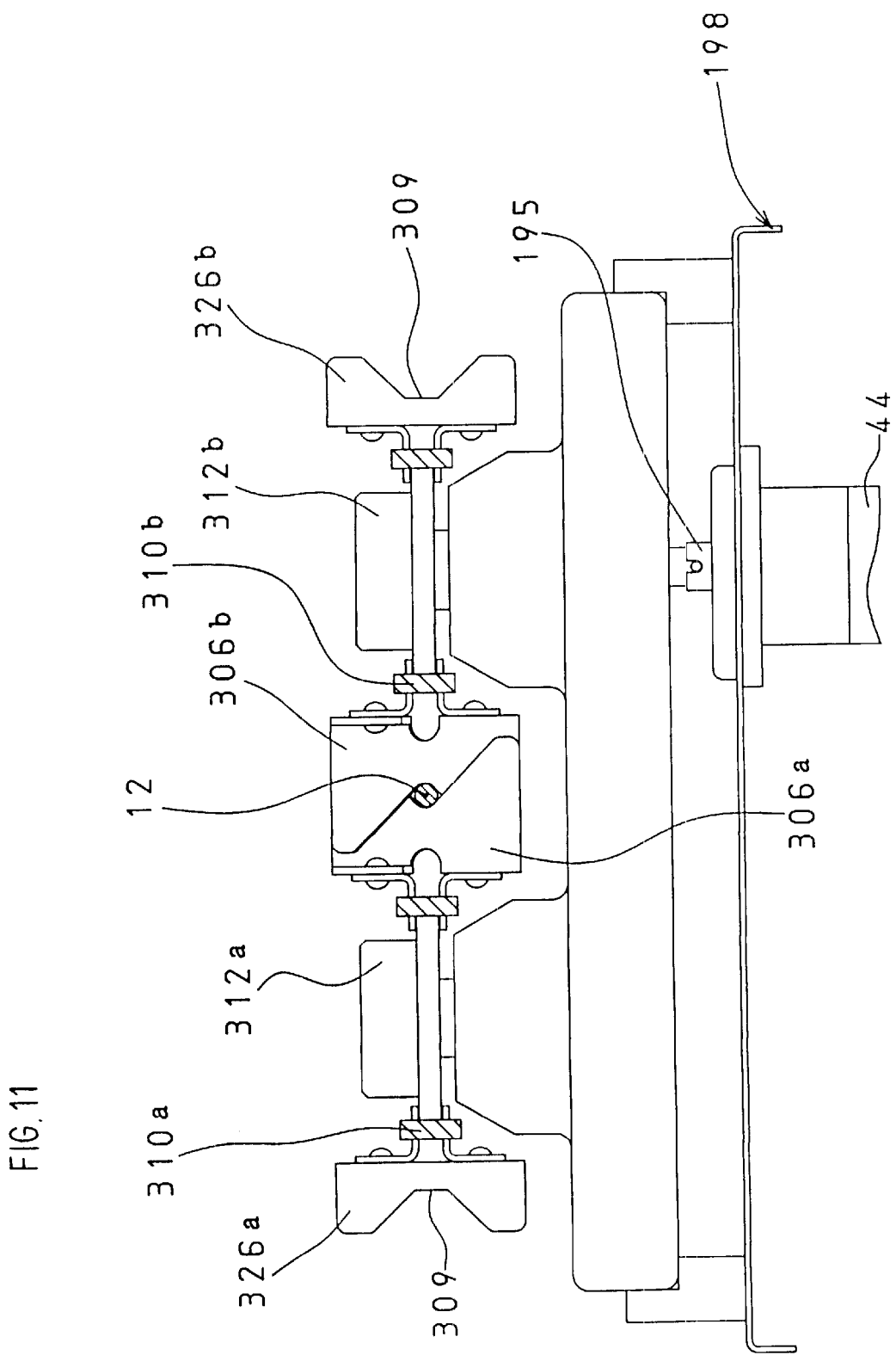
FIG. 11 is an explanatory cross-sectional side view of the linking means shown in FIG. 10.
Figure 12:
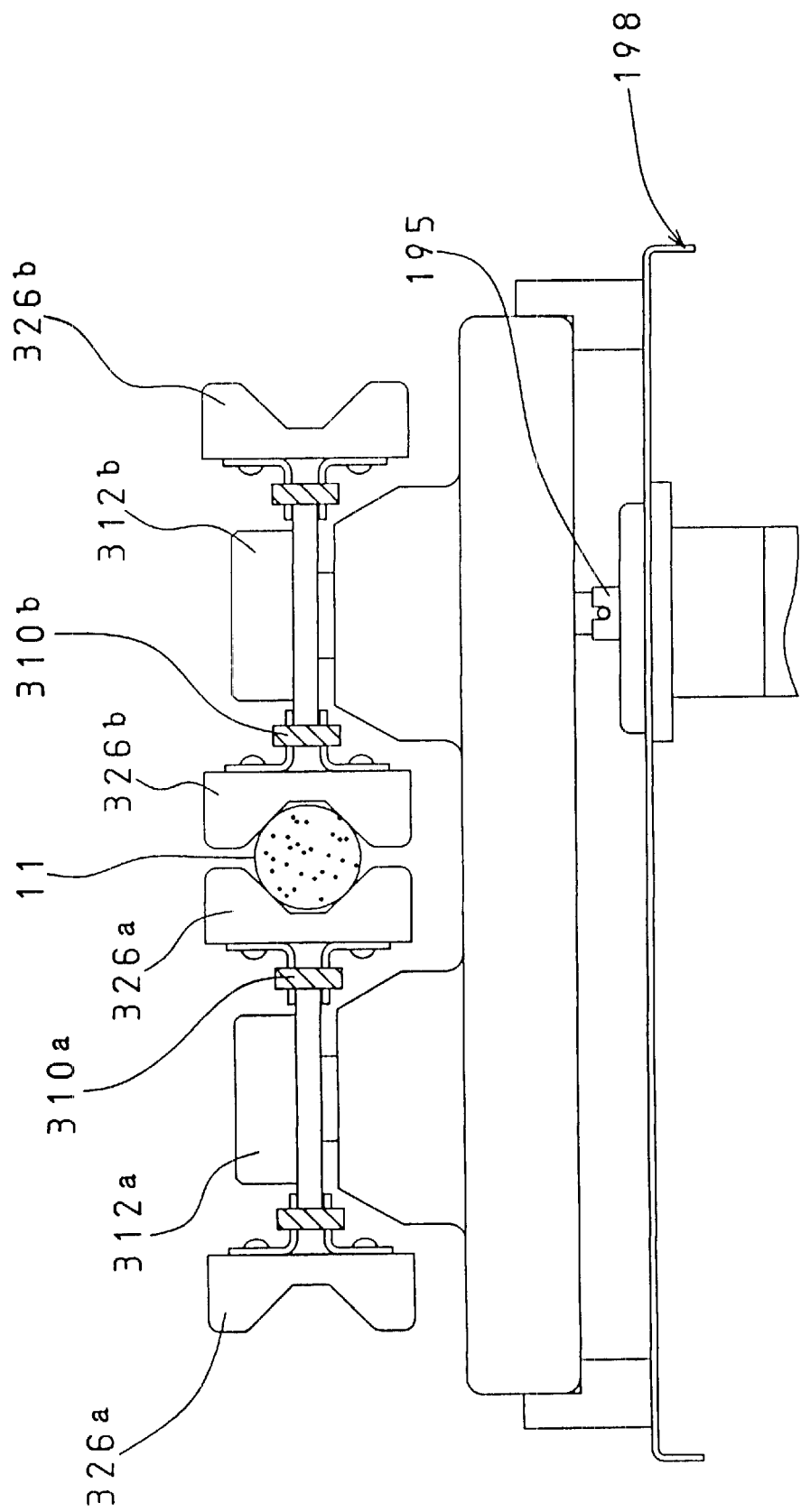
FIG. 12 is an explanatory cross-sectional side view of the linking means shown in FIG. 10.

Referring particularly to FIGS. 10 to 12, the linking means 43 has the following: two pairs of pincher members 306a and 306b, and 307a and 307b which continuously move in a circular motion at a fixed speed in the direction of C so as to move the stuffed natural intestine casing 11 in the direction of B while pinching the stuffed natural intestine casing 11; two endless chains 310a and 310b serving as a wrapping connector member constituting a circulating member 310 which moves generally in a circular motion but moves straightly in an area AA, wherein the endless chains 310a and 310b are provided with the pincher members 306a and 307a, and 306b and 307b, respectively, at an interval L therebetween; and two pairs of sprockets 312a and 312b serving as rotating members around which the endless chins 310a and 310b are respectively wound and which are secured respectively to rotating shafts 305a and 305b having rotational centers 304a and 304b. Each of the pincher members 306a and 306b has a recessed portion 311 defined by V-shaped edges.

In FIGS. 4, 10, and 11, the linking means 43 is mounted on the linking-means supporting member 198 secured to the braking-member supporting member 24, whereby the linking means 43 is disposed at a predetermined position with respect to the stuffing nozzle 3. An arrangement may be provided such that the linking means 43 is attached to the outer side plate 67 by means of the hinge mechanism 22 without being secured to the braking-member supporting member 24. In either arrangement, since the linking means 43 is supported by the outer side plate 67, the positional accuracy with respect to the stuffing nozzle 3 is high.

In FIG. 10, the interval L is longer than the distance D between the respective rotational centers 304*a* and 304*b* of the rotating shafts 305*a* and 305*b*. For this reason, the release of the pinching of the stuffed natural intestine casing 11 by the pincher members 306*a* and 306*b*, 307*a* and 307*b* becomes possible. Consequently, sausages 320 having a link length l different from the interval L between the pincher members 306*a* and 307*a* and between the pincher members 306*b* and 307*b* are manufactured.

In FIGS. 10 and 11, a multiplicity of lugs 326*a* and 326*b* serving as stuffed-casing holding means for holding the stuffed natural intestine casing 11 are attached to the endless chins 310*a* and 310*b* at equal intervals. Recessed portions 309 are respectively formed in the lugs 326*a* and 326*b* so as to hold the stuffed natural intestine casing 11 by coming into contact with the outer peripheral surface of the stuffed natural intestine casing 11. It should be noted that the present invention may be implemented by omitting the lugs 326*a* and 326*b*.

In FIG. 10, the portions of the stuffed natural intestine casing 11 which are consecutively pinched by the pincher members 306*a* and 306*b*, 307*a* and 307*b* are twisted, and the twisted portions 12 are consecutively formed therein. To assist the rotation of the natural intestine casing 10, the braking member 26 is also rotated in the direction of R1 in synchronism with the rotation of the stuffing nozzle 3.

The linking means 43 is adapted to operate as follows. First, as the ground meat 7 is continuously discharged from the material discharge port 9 of the stuffing nozzle 3, the ground meat 7 is continuously charged into the natural intestine casing 10 being pulled out from the distal end 8 of the stuffing nozzle 3, and the stuffed natural intestine casing 11 is formed continuously forwardly of the distal end 8 of the stuffing nozzle 3. The stuffed natural intestine casing 11 is pinched by the pair of pincher members 306*a* and 306*b* which are moved by the endless chins 310*a* and 310*b* and are moved to the mutually meshing position, as shown in FIG. 10. The stuffed natural intestine casing 11, via this pinched portion, is moved further downstream from the distal end 8 of the stuffing nozzle 3 together with the pair of pincher members 306*a* and 306*b* which are moved in the direction of B. During the movement in the direction of B, the stuffed natural intestine casing 11 is twisted at the pinched portion by the rotation of the stuffing nozzle 3, and the twisted portion 12 is formed in the stuffed natural intestine casing 11 by this twist.

Figure 13:
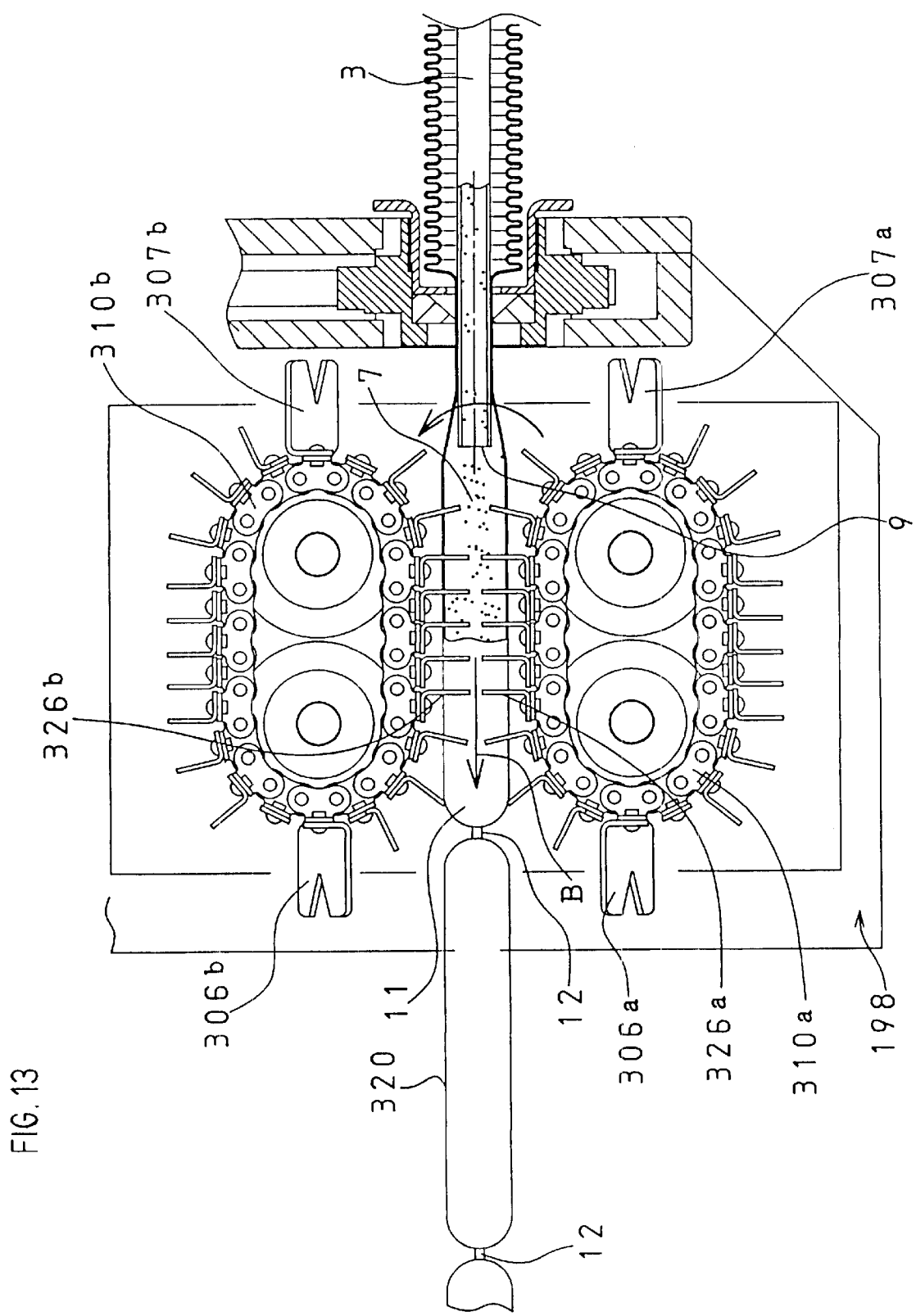
FIG. 13 is a diagram explaining the operation of the linking means shown in FIG. 10.

In FIGS. 10 and 13, the pair of pincher members 306*a* and 306*b* releases their meshing and their pinching of the stuffed natural intestine casing 11, and are moved to the positions shown in FIG. 13. In this state, the stuffed natural intestine casing 11 is not pinched by the ensuing pair of pincher members 307*a* and 307*b*, and simply remains as being held by the lugs 326 which move in the direction of B. In the state in which the stuffed natural intestine casing 11 is held only by the lugs 326, the stuffed natural intestine casing 11 is further subjected to the charging of the ground meat 7 discharged from the material discharge port 9 of the stuffing nozzle 3, and is moved in the direction of B by the discharge pressure of the ground meat 7.

In FIG. 13, while the pinching of the stuffed natural intestine casing 11 by the pincher members 306*a* and 306*b*, 307*a* and 307*b* is released, and the stuffed natural intestine casing 11 is moved in the direction of B by the discharge pressure of the ground meat 7, the moving force may be imparted to the stuffed natural intestine casing 11 by the movement of the lugs 326 in the direction of B. Alternatively, a braking force may be imparted to the stuffed natural intestine casing 11 by the friction between the lugs 326 and the stuffed natural intestine casing 11 by temporarily stopping the endless chins 310*a* and 310*b* or decreasing their speed, for example. The stuffing degree of the stuffed natural intestine casing 11 can be adjusted by appropriately imparting the moving force or the braking force.

When the ensuing pair of pincher members 307*a* and 307*b* are moved to the mutually meshing position as shown in FIG. 10 by the further traveling of the endless chins 310*a* and 310*b* from the state shown in FIG. 13, the stuffed natural intestine casing 11 this time is pinched by the pincher members 307*a* and 307*b*, and moves together with the pincher members 307*a* and 307*b* via the newly pinched portion. During the movement in the direction of B, the stuffed natural intestine casing 11 is twisted at the newly pinched portion by the rotation of the stuffing nozzle 3, and the new twisted portion 12 is formed in the stuffed natural intestine casing 11 by this twist.

With the above-described apparatus 1, particularly as shown in FIG. 4, since the outer side plate 67 of the side wall 53 extends in such a manner as to meet at an angle one edge 52, serving as a specific portion, of the outer front plate 65 of the front wall 51, the main body housing 21 is provided with high accuracy and high rigidity, with the result that the positional accuracy in the mounting of the braking-member supporting member 24 supported on the outer side plate 67 of the side wall 53 can be enhanced, and also the linking means 43 which is supported by the braking-member supporting member 24 can be disposed with high accuracy. In addition, with the apparatus 1, since the outer plate 54, 55, 57, 58, 59, 60, 65, and 67 of the main body housing 21 as shown in FIGS. 1–4 is formed by a thin plate, e.g., 3 mm, the main body housing 21 can be of a simple, light weight and low-cost structure. As shown in FIGS. 4 and 5, by laminating the thick reinforcing front plate 66 and the thick reinforcing side plate 68, e.g., 20 mm, on the outer plate, the accuracy and the rigidity of the main body housing 21 can be further enhanced.

Further, with the apparatus 1 as shown in FIGS. 1, 2, and 5, since the outer front plate portion 65 of the front wall 51 of the main body housing 21 on which the spindle housing 31 and the metering pump 34 are mounted has an upright structure, the relative positional accuracy of the two members is high, and the stagnation of cleaning water on the outer front plate portion 65 can be sanitarily prevented.

In FIGS. 10 and 13, to manufacture a longer sausage 320 having the link length l with the apparatus 1, it suffices if, in a state in which the movement in the direction of B of the pincher members 306*a* and 306*b*, 307*a* and 307*b* and the stuffed natural intestine casing 11 shown in FIG. 13 is interrupted, the traveling of the endless chins 310*a* and 310*b* is temporarily stopped, the pinching operation by the pincher members 306 and 306*b* or 307*a* and 307*b* is set on standby at the position shown in FIG. 13, and the traveling of the endless chins 310*a* and 310*b* is started so that the pincher members are moved to the positions shown in FIG.

10 after the stuffed natural intestine casing 11 of a desired stuffed amount has been moved in the direction of B by the discharge pressure of the ground meat 7 discharged from the material discharge port 9 of the stuffing nozzle 3 so as to start the pinching operation by the pincher members 306a and 306b or 307a and 307b. By effecting the intermittent circulating movement of the pincher members 306a and 306b or 307a and 307b in this manner, longer sausages 320 are formed. Instead of temporarily stopping the travelling of the endless chins, the travelling speed of the endless chins may be decreased.

In addition, with the apparatus 1, it is also possible to change the length l and the weight of the sausage 320 by fixing the period of pinching of the stuffed natural intestine casing 11 by the pincher members and by changing the amount of the discharged ground meat 7. To manufacture natural intestine sausages of a small stuffed amount with the small link length l, it suffices to decrease the amount of discharge of the ground meat 7, whereas to form sausage links 320 of a large stuffed amount with the large link length l, it suffices to increase the amount of discharge of the ground meat 7. In the process of pinching by the pincher members 306a and 306b, 307a and 307b, the moving speed of the stuffed natural intestine casing 11 which has assumed a low stuffing degree or a high stuffing degree changes in accordance with the stuffing degree of the stuffed natural intestine casing 11 during the release of the pinching shown in FIG. 13. Consequently, the sausages 320 having an appropriate stuffing degree are formed, and their length l and weight are changed at the same time.

In addition, with the apparatus 1, it is also possible to change the length l and the weight of the sausage 320 by varying the period of pinching of the stuffed natural intestine casing 11 by the pincher members while maintaining a fixed amount of the ground meat 7.

In FIG. 10, in the present invention, in the case of the natural intestine casing having stretchbility, even if there is excess or deficiency in the amount of discharge of the food material with respect to the stuffed natural intestine casing which has been pinched by the pincher members and is moving, since the contraction and expansion of the natural intestine casing absorbs that gap, the margin of change in the length and weight of the natural intestine sausage link can be made large. In addition to it, since the braking member 26 is disposed at a position with a space from the end of the stuffing nozzle 3 (e.g., 11 mm) longer than the outside diameter (e.g., 10 mm) of the stuffing nozzle 3 as in this embodiment, the aforementioned gap can be further absorbed.

As described above, in the present invention, since the moving speed of the stuffed natural intestine casing during the release of pinching is made variable, the length and the weight of the sausages 320 can be changed to have an appropriate stuffing degree.

In the foregoing embodiment, a description has been given of the manufacturing apparatus 1 comprising the metering pump 34 and used by connecting the metering pump 34 to the separately prepared stuffing pump 196. Next, referring to FIGS. 14(A), 14(B), 15, and 16, a description will be given of a manufacturing apparatus 1A which is not provided with the metering pump and is used by being connected to the stuffing pump 196.

Figure 14B:
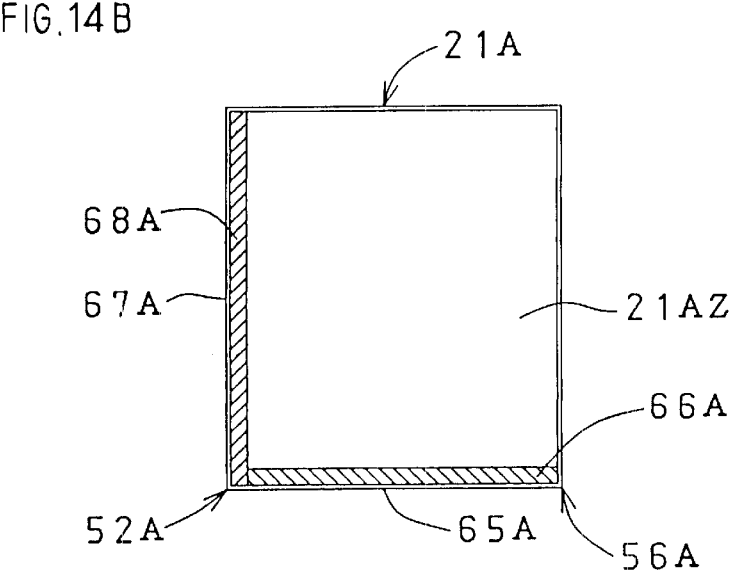
FIG. 14(B) is an explanatory cross-sectional plan view taken along line I—I shown in FIG. 14(A)
Figure 14A:
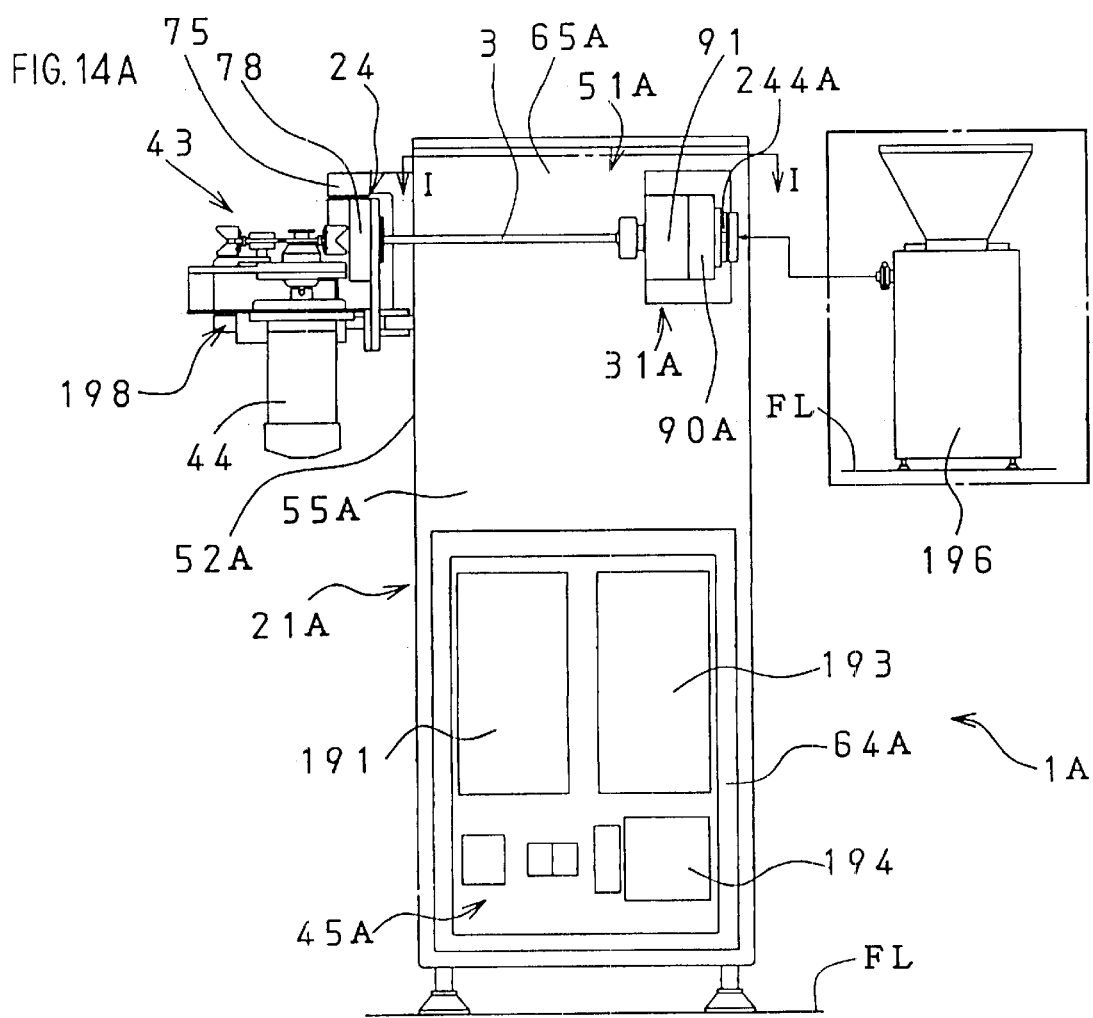
FIG. 14(A) is an explanatory front elevational view of another preferred embodiment of the invention.
Figure 15:
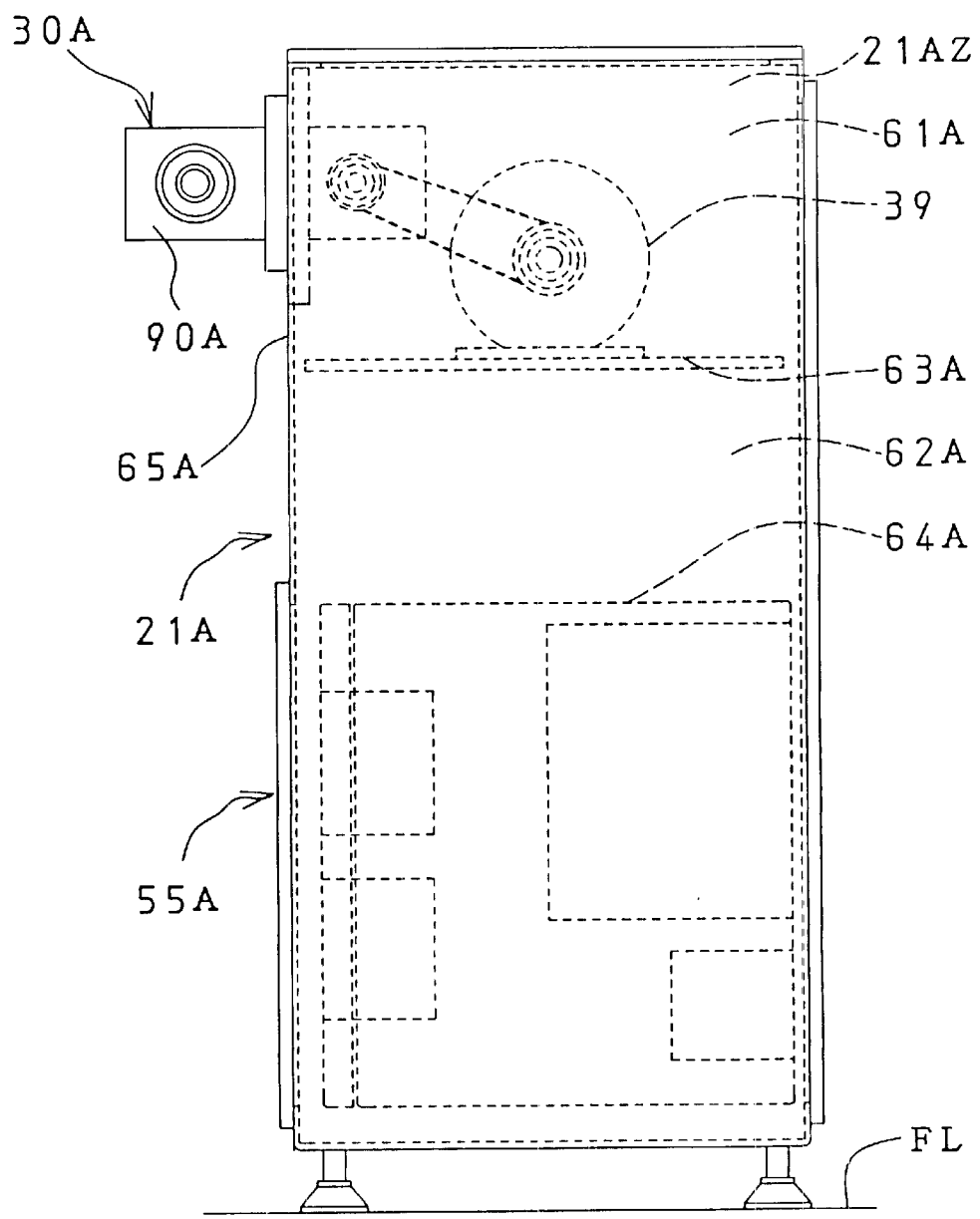
FIG. 15 is an explanatory elevational view of one side of the embodiment shown in FIG. 14(A)
Figure 16:
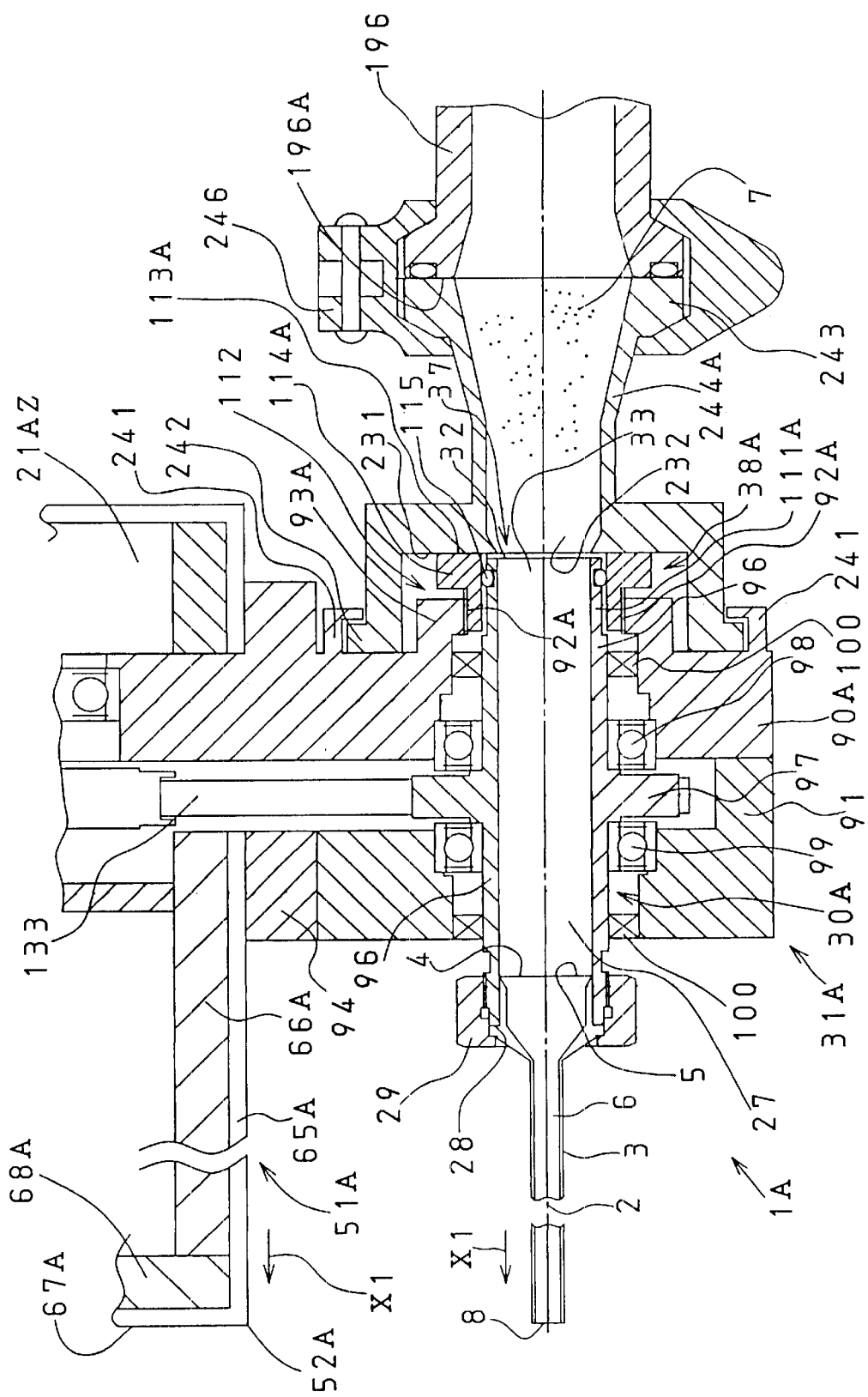
FIG. 16 is an explanatory detailed cross-sectional plan view of parts shown in FIG. 14(A)

In the apparatus 1A, as shown in FIGS. 14(A), 14(B), and 15, the intermediate inclined front wall 54 in the main body housing 21 in the apparatus 1 may be omitted, and the outer front plate portion 65A of the upper flat front wall 51A and the lower front wall 55A may be formed continuously. A main body housing 21A has a flat upright outer front plate portion 65A and a continuous flat upright outer side plate 67A in such a manner as to extend integrally with and continuously from one edge 52A serving as a specific portion in a direction of meeting the outer front plate portion 65A at an angle. A thick reinforcing plate 66A is laminated on or joined to the outer front plate portion 65A, and a thick reinforcing plate 68A is laminated on or joined to the outer side plate 67A. A spindle housing 31A is provided on the outer front plate portion 65A, and the braking-member supporting member 24 is provided on the outer side plate 67A. In an upper portion 61A of an interior 21AZ of the main body housing 21A, the electric motor 39 for a hollow spindle 30A shown in FIG. 16 is disposed on an intermediate inner board 63A. In a lower portion 62A, a controlling means 45A for controlling the electric motor 39 and the electric motor 44 for the linking means 43 is provided. The inverter 191 and the inverter 193 constituting the controlling means 45A are accommodated in a control box 64A.

In FIG. 16, a plurality of collar portions 242 which can be detachably engaged with a plurality of projecting portions 241 formed integrally with the spindle housing body 90A are provided at one end portion of the material-supplying-port member 244A, while a flange 243 is provided at the other end portion thereof. The flange 243 is fastened to the stuffing pump 196 by means of a clamp 246. The material-supplying-port member 244 also serves as a coupling means for coupling the apparatus 1A and the stuffing pump 196. In the material-leakage preventing means 38A shown in FIG. 16, the aforementioned annular seal member 116 in the above-mentioned apparatus 1 is omitted, and the annular seal member 115 is fitted to an outer peripheral surface of the other end portion 111A of the hollow spindle 30A and is slidably in contact with the inner peripheral surface of the tubular member 114A. A nut portion 93A is formed integrally with the spindle housing body 90A. The tubular member 114A is made to press on and contact with one end face 231 defining a material supplying port 232 of the material-supplying-port member 244A by means of the threaded portion 92A serving as the pressing means 112.

The material-leakage preventing means 38A may be formed without using a material-supplying-port member 244A and by causing an annular end face 113A of a tubular member 114A to be pressed and abut against one end face 196A of the stuffing pump 196.

In accordance with the apparatus 1 and 1A as shown in FIGS. 1, 2, 5, 14A, and 15, the main body housings 21 and 21A can be made compact since the spindle housings 31 and 31A are attached to the outer front plate portions 65 and 65A, respectively, the electric motor 39 is disposed in the upper portions 61 and 61A, and the controlling means 45 and 45A are disposed in the lower portions 62 and 62A at a position below the electric motor 39. Accordingly, the height of the stuffing nozzle 3 from the floor surface FL can be set to a height (e.g., 1 m) which facilitates the operation of fitting the casing 10 over the stuffing nozzle 3.

In addition, with the apparatus 1 and 1A as shown in FIGS. 4, 5, and 15, since the spindle housings 31 and 31A are detachably attached to the outer front plate portions 65 and 65A in such a manner as to project on one side forwardly from the outer front plate portions 65 and 65A of the front walls 51 and 51A, and project on the other side into the interior portions 21Z and 21AZ of the main body housings 21 and 21A, and have the seats 94 and 94A, the replacement of parts inside the spindle housings 31 and 31A is facilitated.

Next, a description will be given of an apparatus in accordance with another embodiment in which the front plate of the main body housing is inclined with respect to the vertical plane.

Figure 17:
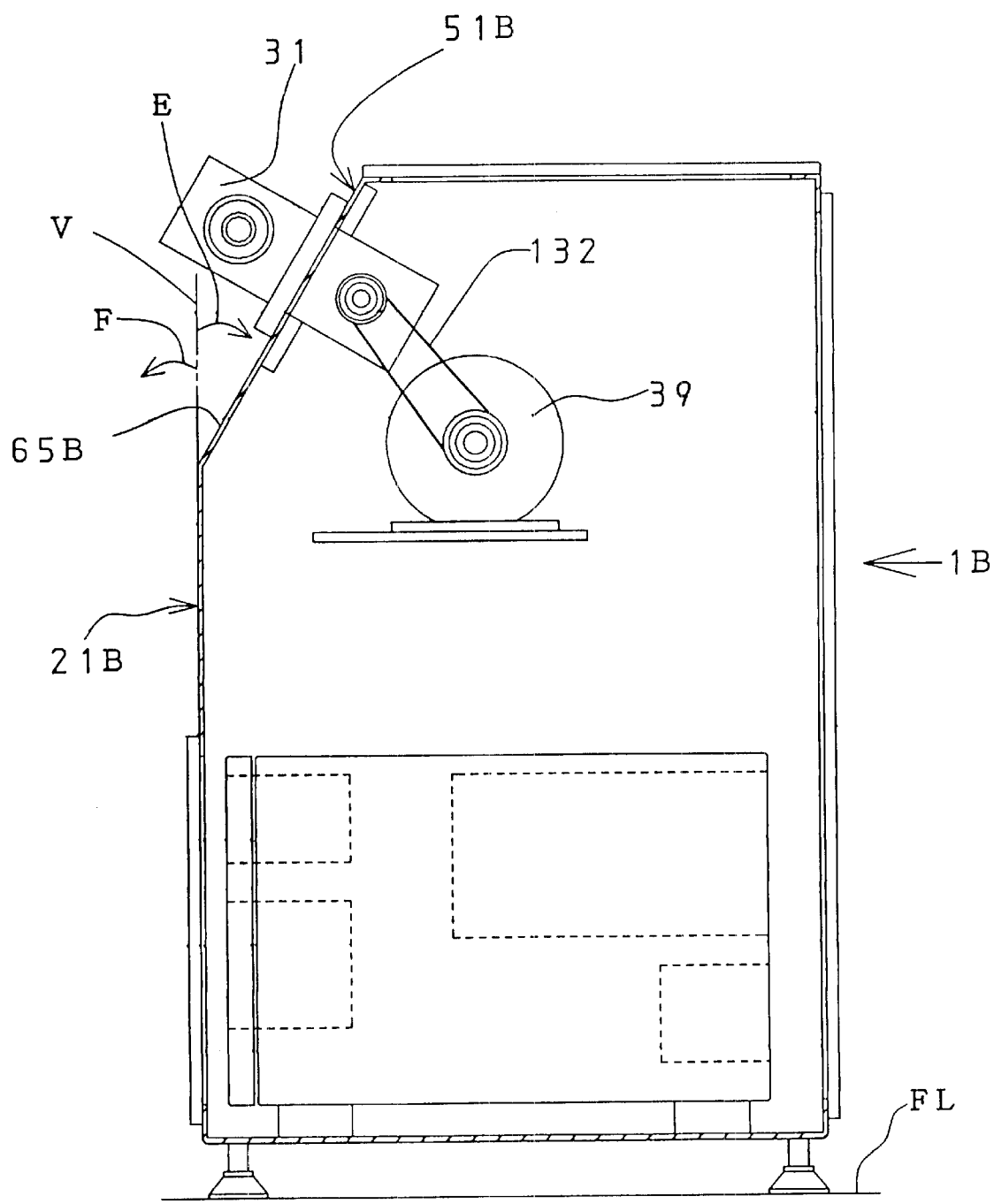
FIG. 17 is an explanatory side view of a further preferred embodiment of the invention.

In an apparatus 1B shown in FIG. 17, a outer front plate portion 65B on which the spindle housing 31 is mounted is inclined in the direction of E from a vertical plane V. The apparatus 1B excels in the efficiency of the disassembling and reassembling operation of the spindle housing 31 and the metering pump 34 (not shown). The outer front plate portion 65B may be oppositely inclined in the direction of F from the vertical plane V. If this arrangement is adopted, the drainage of water from the outer front plate portion 65B is facilitated further.

The forms of the linking means used in the apparatuses 1, 1A, and 1B are not limited to those of the above-described linking means 43. Another type of the linking means will be described below.

Figure 18:
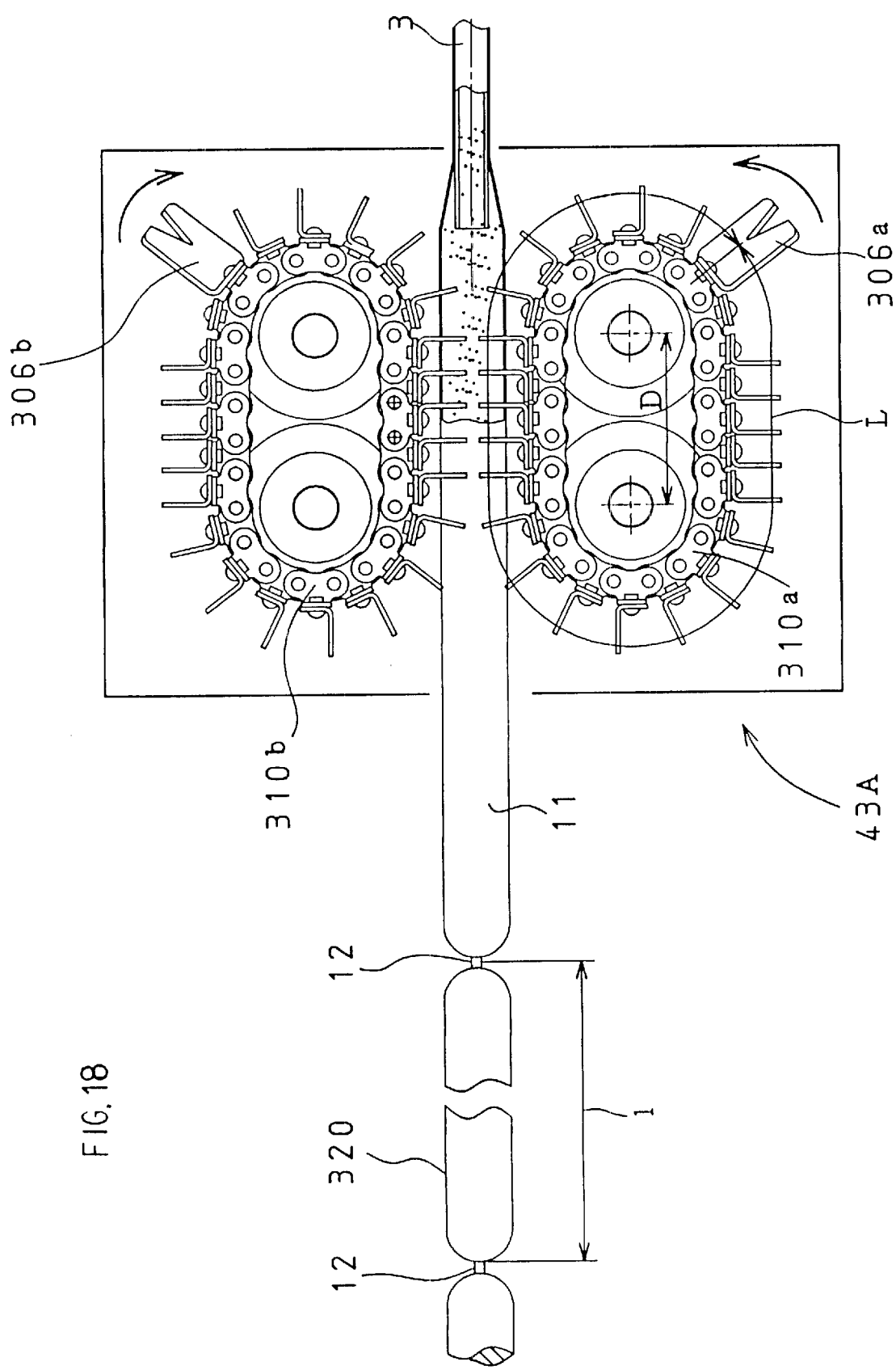
FIG. 18 is an explanatory plan view of another preferred example of the linking means in accordance with the invention.

A linking means 43A shown in FIG. 18 is constructed by attaching only one pair of pincher members 306a and 306b to the pair of endless chins 310a and 310b, respectively. By causing the endless chins 310a and 310b with the pincher members 306a and 306b attached thereto and having the attachment interval L to travel at a continuous fixed speed, the sausages 320 having the twisted portions 12 with the link length l are formed.

Figure 19:
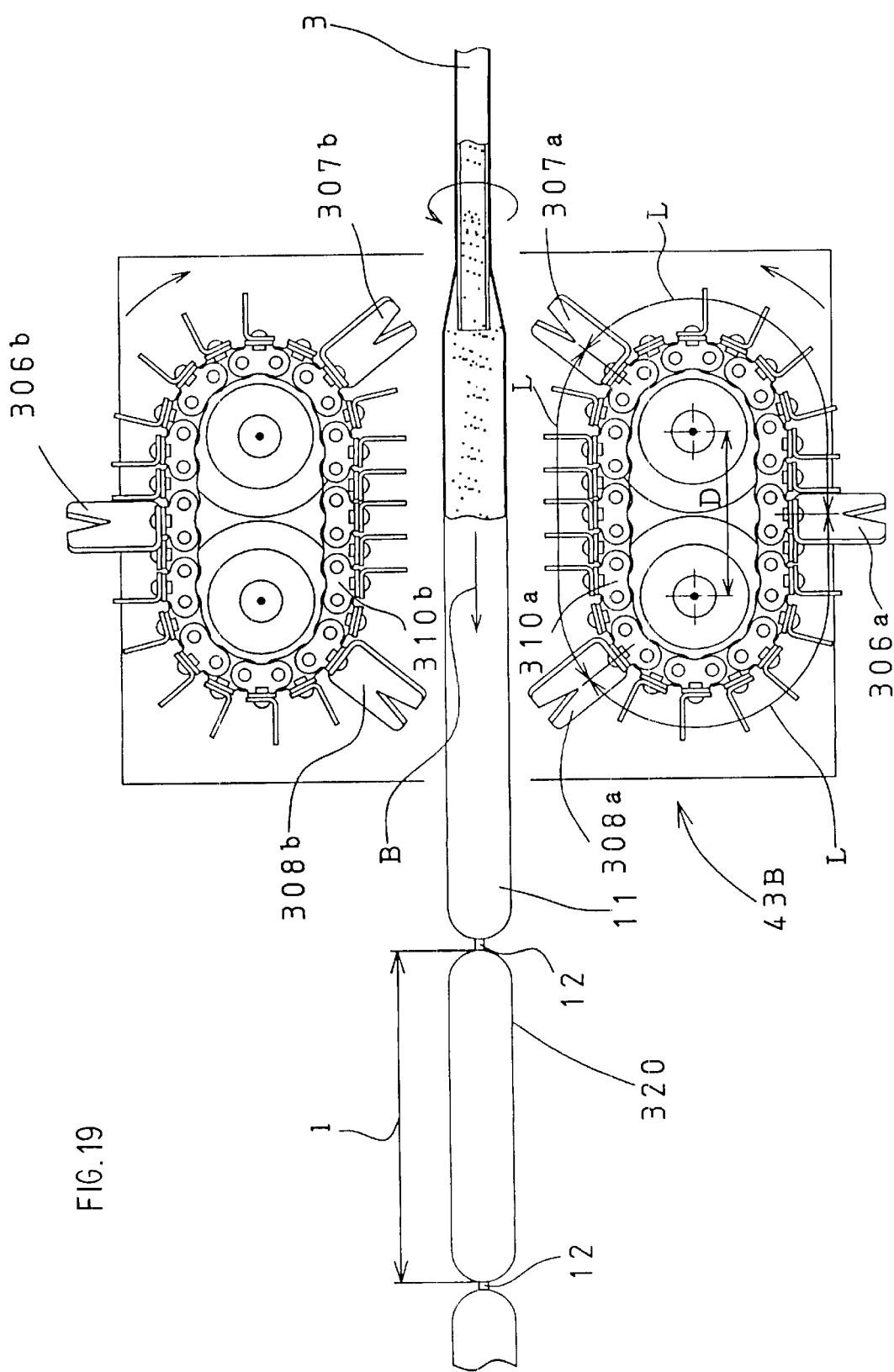
FIG. 19 is an explanatory plan view of still another preferred example of the linking means in accordance with the invention.

In addition, as shown in FIG. 19, the linking means 43B may be constructed by respectively attaching three pairs of pincher members 306a and 306b, 307a and 307b, and 308a and 308b to one pair of endless chins 310a and 310b at equal intervals L.

Figure 20:
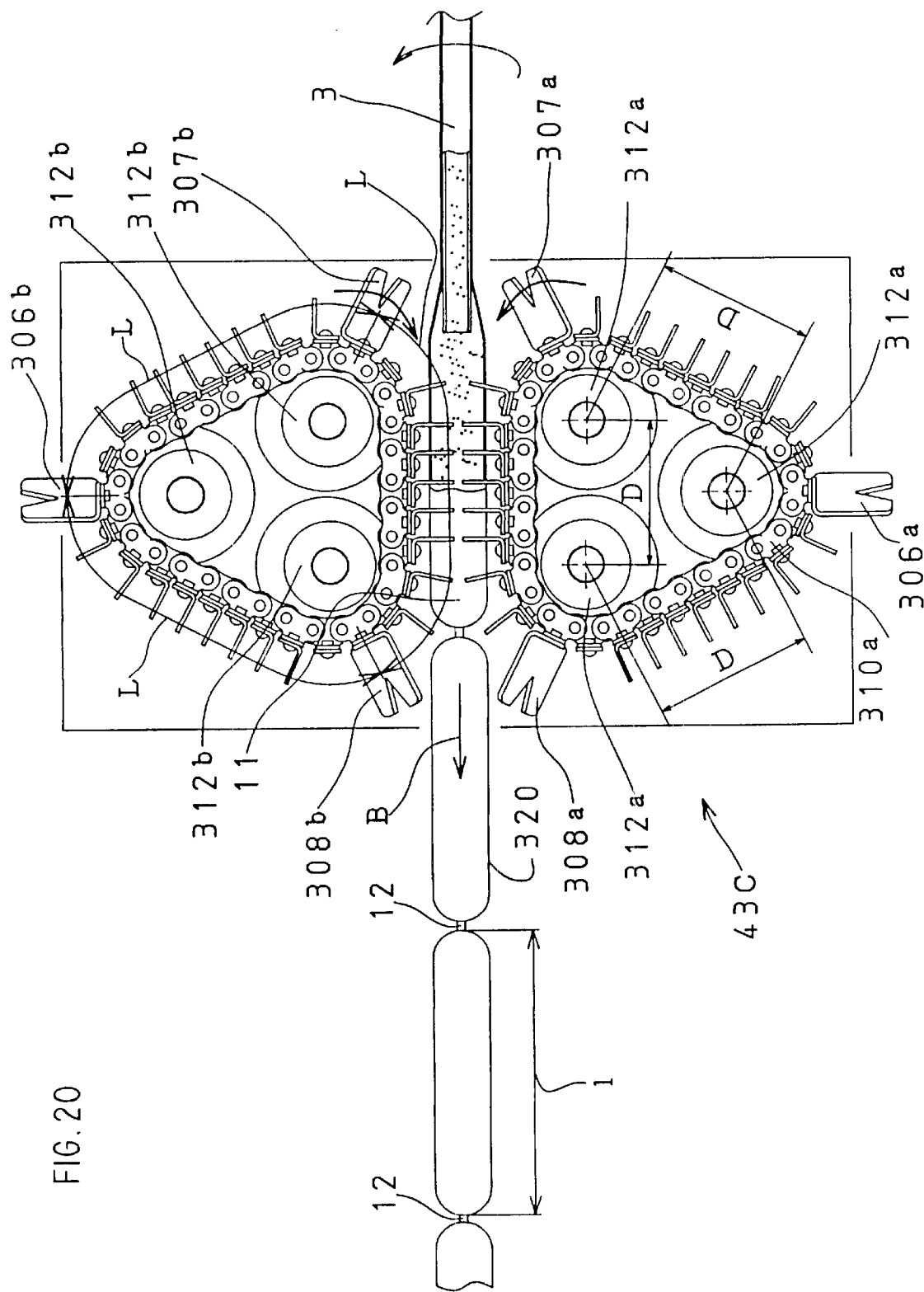
FIG. 20 is an explanatory plan view of a further preferred example of the linking means in accordance with the invention.
Figure 21:
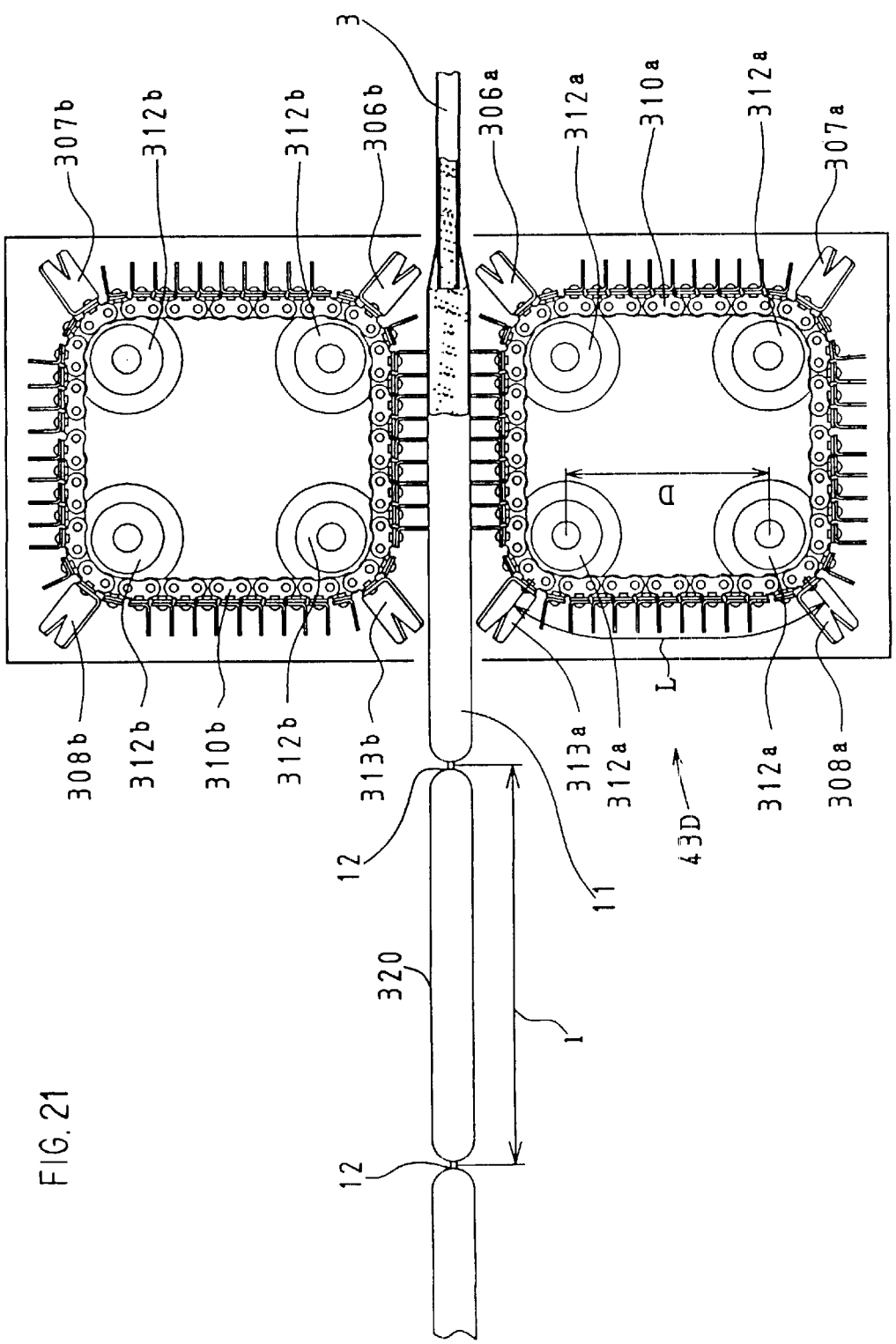
FIG. 21 is an explanatory plan view of a still further preferred example of the linking means in accordance with the invention.

Still further, as shown in FIGS. 20 and 21, the linking means may be constructed by attaching a plurality of pincher members to a pair of circulating members which are each formed in a polygonal shape. In the linking means 43C shown in FIG. 20, three pairs of pincher members 306a and 306b, 307a and 307b, and 308a and 308b are attached at equal intervals L to one pair of endless chins 310a and 310b which are each wound around three sprocket wheels 312a or 312b in a triangular shape. In the linking means 43D shown in FIG. 21, four pairs of pincher members 306a and 306b, 307a and 307b, 308a and 308b, and 313a and 313b are attached at equal intervals L to one pair of endless chins 310a and 310b which are each wound around four sprocket wheels 312a or 312b in a square shape. If the number of pincher members is increased by training the endless chins 310a and 310b around the sprockets in a polygonal shape, the arrangement is suitable for the formation of the sausages 320 with the smaller link length l.

With the linking means 43A, 43B, 43C, and 43D shown in FIGS. 18 to 21 referred to above, it is possible to change the link length l and the link weight of the sausage 320 in a manner similar to that of the linking means 43 shown in FIG. 10.

Figure 22:
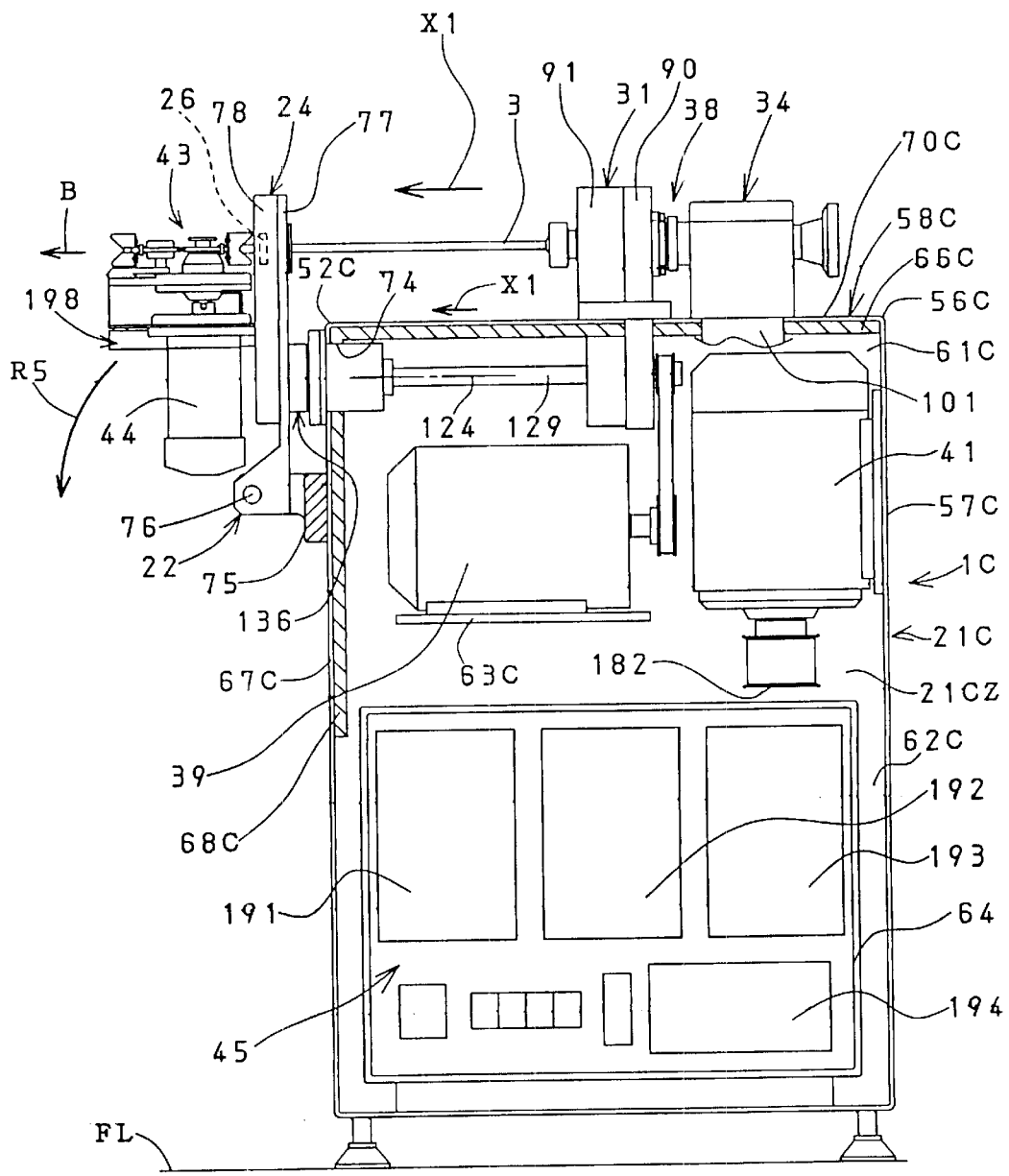
FIG. 22 is an explanatory front elevational view of a further preferred example of the invention.
Figure 23:
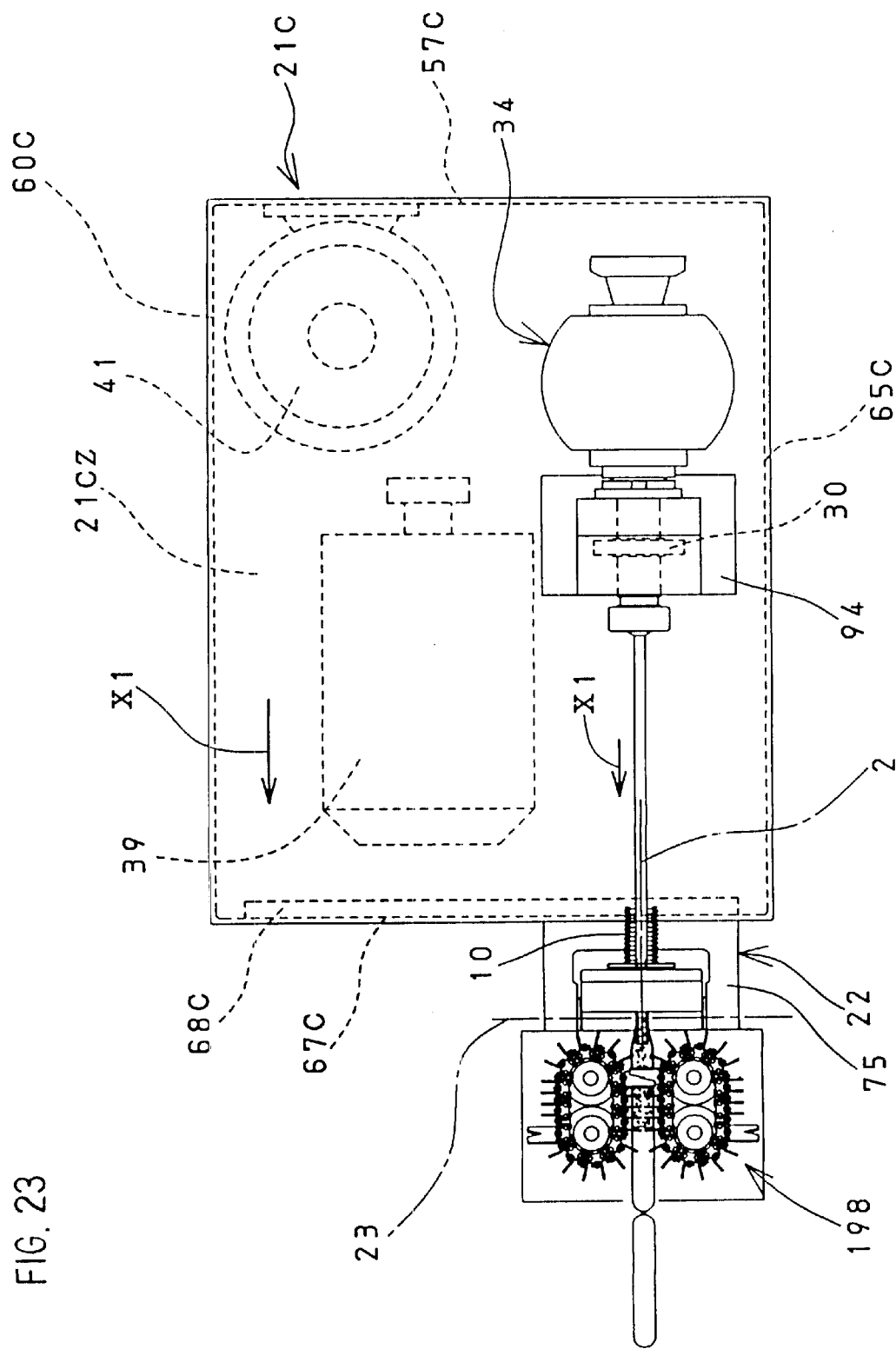
FIG. 23 is an explanatory plan view of the embodiment shown in FIG. 22.

In FIGS. 22 and 23, a still another type of apparatus 1C has a main body housing 21C in which a top plate 70C, which is abase plate serving as abase wall where the spindle housing 31 is mounted, is arranged horizontally. The main body housing 21C has atop plate 70C extending horizontally in the direction of X1, a side plate 67C serving as a side wall and extending vertically downward from one edge 52C serving as a specific portion of the top plate 70C in such a manner as to meet the top plate 70C at an angle, a front plate 65C, a side wall 57C, and a rear wall 60C. The main body housing 21C of the apparatus 1C has high rigidity and high accuracy since the plate for supporting the braking-member supporting member 24 extends from one edge of the plate where the spindle housing 31 is mounted, in such a manner to meet the one edge at an angle in the same way as with the apparatuses 1 and 1A. A thick reinforcing plate 66C is laminated on or joined to the top plate 70C, and a thick reinforcing plate 68C is laminated on or joined to the side plate 67C. In the main body housing 21C, in the same way as with the apparatuses 1 and 1A, the aforementioned rigidity and accuracy of the main body housing 21C can be further increased by using the thick reinforcing plate.

The motor 39 for driving the hollow spindle 30 is disposed uprightly in an upper portion 61C of an interior 21CZ of the main body housing 21C, and the control box 64 accommodating the controlling means 45 is disposed uprightly in a lower portion 62C below an intermediate inner board 63C. The spindle housing 31 and the metering pump 34 are mounted on the top plate 70C, and the braking-member supporting member 24 is attached to the side plate 67C by means of the hinge mechanism 22. The braking-member supporting member 24 and the linking-means supporting member 198 secured to the braking-member supporting member 24 are rotatable about the axis 23 of the hinge mechanism 22 in the direction of R5. Since, in this embodiment, the same reference numerals as those of the apparatus 1 denote parts or portions having the same construction as that of the apparatus 1, a description thereof will be omitted.

In this apparatus 1C, since the braking-member supporting member 24 is swung downward in the direction of R5, the natural intestine casing 10 can be fitted over the stuffing nozzle 3 more easily. In this embodiment as well, in the same way as the apparatus 1 in the foregoing embodiment, the relative positional accuracy between the braking member 26 and the stuffing nozzle 3 can be secured at a high level, and the size of the main body housing 21C with respect to the axis 2 of the stuffing nozzle 3 can be made small. If the controlling means 45 is disposed horizontally by laying down the control box 64 by rotating it 90 degrees from the illustrated upright, or if the controlling means 45 is disposed in an inclined state, the size of the main body housing 21C with respect to the heightwise direction can be made small.

In the present invention, it is possible to use a linking means, a braking member, and a stuffing nozzle which are publicly known. As the linking means, it is possible to use, for instance, a linking device shown in FIGS. 8 and 9 of U.S. Pat. No. 3,115,668, or an apparatus shown in FIG. 11 in U.S. Pat. No. 5,830,051. As the braking member and the stuffing nozzle, it is possible to use a chuck shown in FIGS. 6 and 7 of U.S. Pat. No. 3,115,668 and a stuffing tube shown in FIG. 5 thereof.

In accordance with the present invention, the following advantages are offered:

1. It is possible to provide an apparatus for manufacturing linked food products having twisted portions such as sausages which is particularly suitable for the manufacture of natural intestine sausages, is compact, and permits high-speed operation.
2. It is possible to provide an apparatus for manufacturing linked food products having twisted portions such as sausages which is particularly suitable for the manufacture of natural intestine sausages, is compact, and permits high-speed operation, and which excels in sanitation.
3. It is possible to provide an apparatus for manufacturing linked food products having twisted portions such as sausages which permits high-speed production of sausages having a fixed quantity and an appropriate stuffing degree by using a natural intestine casing having large deviation of the diameter.
4. It is possible to provide a method and a compact apparatus for manufacturing linked food products having twisted portions such as sausages which are particularly suitable for the manufacture of natural intestine sausages and make it possible to change the link length of sausages and the stuffed weight of the links.

What is claimed is:

1. An apparatus for manufacturing linked food products having twisted portions including a stuffing nozzle for discharging from its distal end a food product material supplied from its material inlet port and for forming a stuffed casing stuffed with the food product material, a hollow spindle for rotating said stuffing nozzle, and a braking member for engaging an outer surface of the casing on said stuffing nozzle, said apparatus comprising:

a main body housing having abase plate extending in the same direction as a direction in which said stuffing nozzle extends from the material inlet port toward the distal end, and a side plate extending from a specific portion in said direction of said base plate in such a manner as to meet said base plate at an angle;

a spindle housing attached to said base plate so as to rotatably support said hollow spindle; and a braking-member supporting member disposed at a position opposing said side plate so as to support said braking member at a predetermined position with respect to said stuffing nozzle.

2. An apparatus for manufacturing linked food products having twisted portions including a stuffing nozzle for discharging from its distal end a food product material supplied from its material inlet port and for forming a stuffed casing stuffed with the food product material, a hollow spindle for rotating said stuffing nozzle, and a braking member for engaging an outer surface of the casing on said stuffing nozzle, said apparatus comprising:

a main body housing having abase plate extending in the same direction as a direction in which said stuffing nozzle extends from the material inlet port toward the distal end, and a side plate extending from specific portion in said direction of said base plate in such a manner as to meet said base plate at an angle;

a spindle housing attached to said base plate so as to rotatably support said hollow spindle; and a braking-member supporting member attached to said side plate of said main body housing such that said braking-member supporting member moves away from or in close to said side plate so as to support said braking member at a predetermined position with respect to said stuffing nozzle.

3. An apparatus for manufacturing linked food products having twisted portions including a stuffing nozzle for discharging from its distal end a food product material supplied from its material inlet port and for forming a stuffed casing stuffed with the food product material, and a hollow spindle for rotating said stuffing nozzle, said apparatus comprising:

a main body housing having abase plate extending in the same direction as a direction in which said stuffing nozzle extends from the material inlet port toward the distal end, and a side plate extending from a specific portion in said direction of said base plate in such a manner as to meet said base plate at an angle;

a spindle housing attached to said base plate so as to rotatably support said hollow spindle;

a metering pump attached to said base plate so as to supply the food product material into said material inlet port;

a motor disposed in an upper portion of an interior of said main body housing so as to rotatively drive said hollow spindle;

a motor disposed in the upper portion of the interior of said main body housing so as to drive said metering pump; and controlling means disposed in a lower portion of the interior of said main body housing so as to control at least one of said motors.

4. The apparatus for manufacturing linked food products having twisted portions according to claim 3, wherein said base plate of said main body housing is provided in such a manner as to extend vertically.

5. An apparatus for manufacturing linked food products having twisted portions including a stuffing nozzle for discharging from its distal end a food product material supplied from its material inlet port and for forming a stuffed casing stuffed with the food product material, a hollow spindle for rotating said stuffing nozzle, and a braking member for engaging an outer surface of the casing on said stuffing nozzle, said apparatus comprising:

a main body housing having a front wall provided uprightly in such a manner as to extend in the same direction as a direction in which said stuffing nozzle extends from the material inlet port toward the distal end, and a side wall provided uprightly and extending from a specific portion in said direction of said front wall in such a manner as to meet said front wall at an angle;

a spindle housing attached to said front wall so as to rotatably support said hollow spindle;

a motor disposed in an interior of said main body housing so as to rotatively drive said hollow spindle;

a rotatively driving shaft disposed in the interior of said main body housing so as to rotate said braking member; and said side wall having a through hole formed therein about an axis of said rotatively driving shaft for rotating said braking member.

6. An apparatus for manufacturing linked food products having twisted portions including a stuffing nozzle for discharging from its distal end a food product material supplied from its material inlet port and for forming a stuffed casing stuffed with the food product material, a hollow spindle for rotating said stuffing nozzle, and a braking member for engaging an outer surface of the casing on said stuffing nozzle, said apparatus comprising:

a main body housing having a front plate provided uprightly in such a manner as to extend in the same direction as a direction in which said stuffing nozzle extends from the material inlet port toward the distal end, and a side plate provided uprightly and extending from a specific portion in said direction of said front plate in such a manner as to meet said front plate at an angle;

a spindle housing attached to said front plate so as to rotatably support said hollow spindle;

a motor disposed in an interior of said main body housing so as to rotatively drive said hollow spindle; and a rotatively driving shaft disposed in the interior of said main body housing so as to rotate said braking member;

said side plate having a through hole formed therein about an axis of said rotatively driving shaft for rotating said braking member.

7. The apparatus for manufacturing linked food products having twisted portions according to claim 6, further comprising:

controlling means disposed in a lower portion of the interior of said main body housing so as to control said motor for rotatively driving said hollow spindle, wherein said motor is disposed in an upper portion of the interior of said main body housing.

8. The apparatus for manufacturing linked food products having twisted portions according to claim 6, further comprising:
a braking-member supporting member disposed at a position opposing said side plate of said main body housing so as to support said braking member at a predetermined position with respect to said stuffing nozzle.

9. The apparatus for manufacturing linked food products having twisted portions according to claim 6, further comprising:
a metering pump attached to said front plate of said main body housing so as to supply the food product material into said material inlet port of said stuffing nozzle.

10. The apparatus for manufacturing linked food products having twisted portions according to claim 9, further comprising:
a motor disposed in an upper portion of the interior of said main body housing so as to drive said metering pump; and
controlling means disposed in a lower portion of the interior of said main body housing so as to control said motor for driving said metering pump.

11. The apparatus for manufacturing linked food products having twisted portions according to claim 6, further comprising:
a linking means having a circulating member moving in a circular motion and at least one pincher member provided on said circulating member so as to pinch the stuffed casing.

12. The apparatus for manufacturing linked food products having twisted portions according to claim 8, wherein said braking-member supporting member has a hinge mechanism attached to said side plate of said main body housing.

13. The apparatus for manufacturing linked food products having twisted portions according to claim 11, further comprising:
a linking-means supporting member for supporting said linking means at a predetermined position with respect to said stuffing nozzle, said linking-means supporting member having a hinge mechanism attached to said side plate of said main body housing.

14. The apparatus for manufacturing linked food products having twisted portions according to claim 6 or 11, further comprising:
a hinge mechanism attached to said side plate of said main body housing so as to rotatively support said linking means and said braking member.

15. The apparatus for manufacturing linked food products having twisted portions according to claim 6, further comprising:
a reinforcing front plate joined to an inner surface of said front plate of said main body housing and a reinforcing side plate joined to an inner surface of said side plate of said main body housing.

16. The apparatus for manufacturing linked food products having twisted portions according to claim 7 or 10, further comprising:
a control box for accommodating said controlling means.

17. An apparatus for manufacturing linked food products having twisted portions including a stuffing nozzle for discharging from its distal end a food product material supplied from its material inlet port and for forming a stuffed casing stuffed with the food product material, a hollow spindle for rotating said stuffing nozzle, and linking means having a circulating member moving in a circular motion provided with pincher member which moves downstream of the distal end of said stuffing nozzle while pinching the stuffed casing, said apparatus comprising:
a main body housing having a base plate extending in the same direction as a direction in which said stuffing nozzle extends from the material inlet port toward the distal end, and a side plate extending from a specific portion in said direction of said base plate in such a manner as to meet said base plate at an angle;
a spindle housing attached to said base plate so as to rotatably support said hollow spindle; and
a linking-means supporting member provided by being supported by said side plate so as to support said linking means at a predetermined position with respect to said stuffing nozzle.

18. A method of manufacturing linked food products having twisted portions, comprising the steps of:
inserting a distal end of a stuffing nozzle, over which a non-stuffed casing is fitted, through a space defined by an inner peripheral edge of a braking member for applying a brake to a movement of said non-stuffed casing;
continuously discharging a food product material from said distal end of said stuffing nozzle into said non-stuffed casing fitted over said stuffing nozzle so as to form a stuffed casing;
successively pinching said stuffed casing by at least one pincher member which moves in a circular motion so that said pinched stuffed casing moves downwardly from said distal end with said pincher member;
rotating said stuffed casing by rotating said stuffing nozzle so that a twisted portion is formed at a portion of said stuffed casing during said movement of said stuffed casing;
wherein a second pinching subsequent to a first pinching of said stuffed casing by said pincher member is effected after release of said first pinching so as to temporarily stop said movement of said stuffed casing by said pincher member; and
continuously discharging said food product material to said stuffed casing, said movement of which has been stopped.

19. The method of manufacturing linked food products having twisted portions according to claim 18, wherein a moving speed of said stuffed casing which moves is varied in a state in which said pinching by said pincher member is released.

20. The method of manufacturing linked food products having twisted portions according to claim 18, wherein said stuffed casing, said pinching of which by said pincher member has been released, is moved by pressure of said discharging of said food product material.

21. The method of manufacturing linked food products having twisted portions according to claim 18, wherein said pincher member is continuously moved at a fixed speed.

22. The method of manufacturing linked food products having twisted portions according to claim 18, wherein said pincher member is moved in a circular motion at a speed which is varied in a pinching period.

23. The method of manufacturing linked food products having twisted portions according to claim 18, wherein a period of said pinching of said stuffed casing by said pincher member is fixed, and an amount of said food product material discharged from said distal end of said stuffing nozzle is varied.

24. The method of manufacturing linked food products having twisted portions according to claim 18, wherein an amount of the food product material discharged from the distal end of said stuffing nozzle is fixed, and a moving speed of said pincher member is varied.

25. The method of manufacturing linked food products having twisted portions according to claim 18, wherein a natural intestine casing is fitted over said stuffing nozzle.

26. An apparatus for manufacturing linked food products having twisted portions, comprising:

a stuffing nozzle for discharging from its distal end a food product material supplied from its material inlet port, into a non-stuffed casing fitted over said stuffing nozzle and for forming a stuffed casing stuffed with said food product material;

a braking member having an inner peripheral edge, which is brought into contact with an outer peripheral surface of said non-stuffed casing, and provided at a position spaced from said distal end of said stuffing nozzle in a direction opposite to a direction of said discharging of said food product material; and a linking means successively pinching said stuffed casing rotated by a rotation of said non-stuffed casing, and forming a twisted portion at a pinched portion of said stuffed casing while moving said stuffed casing downstream of said distal end of said stuffing nozzle for forming said stuffed casing into links, wherein said linking means includes a circulating member having at least one wrapping connector member which moves in a circular motion including an area in which said wrapping connector member moves straightforwardly and at least one pincher member pinching said stuffed casing in said area, and wherein said pincher member is provided on said wrapping connector member such that a second pinching subsequent to a first pinching of said stuffed casing by said pincher member is effected after release of said first pinching so that said movement of said stuffed casing by said pincher member is temporarily stopped.

27. The apparatus for manufacturing linked food products having twisted portions according to claim 26, wherein said circulating member is formed by a pair of said wrapping connector members disposed in face-to-face relation to each other, and said at least one pincher member is provided on said wrapping connector members respectively to form a pair.

28. The apparatus for manufacturing linked food products having twisted portions according to claim 27, wherein one pincher member is secured to each of said wrapping connector members.

29. The apparatus for manufacturing linked food products having twisted portions according to claim 27, wherein two pincher members are secured to each of said wrapping connector members.

30. The apparatus for manufacturing linked food products having twisted portions according to claim 27, wherein each of said wrapping connector members is trained in a polygonal shape around a plurality of rotational centers, and said pincher members are secured to said wrapping connector members at an equal interval and in a number equal to the number of the rotational centers.

31. An apparatus for manufacturing linked food products having twisted portions including a stuffing nozzle for discharging from its distal end a food product material supplied from its material inlet port and for forming a stuffed casing stuffed with the food product material, a hollow spindle for rotating said stuffing nozzle, and a braking member for engaging an outer surface of the casing on said stuffing nozzle, said apparatus comprising:

a main body housing having abase wall extending in the same direction as a direction in which said stuffing nozzle extends from the material inlet port toward the distal end, and a side wall extending from a specific portion in said direction of said base wall in such a manner as to meet said base wall at an angle;

a spindle housing attached to said base wall so as to rotatably support said hollow spindle; and a braking-member supporting member disposed at a position opposing said side wall so as to support said braking member at a predetermined position with respect to said stuffing nozzle.

32. An apparatus for manufacturing linked food products having twisted portions including a stuffing nozzle for discharging from its distal end a food product material supplied from its material inlet port and for forming stuffed casing stuffed with the food product material, a hollow spindle for rotating said stuffing nozzle, and a braking member for engaging an outer surface of the casing on said stuffing nozzle, said apparatus comprising:

a main body housing having a base wall extending in the same direction as a direction in which said stuffing nozzle extends from the material inlet port toward the distal end, and a side wall extending from a specific portion in said direction of said base wall in such a manner as to meet said base wall at an angle;

a spindle housing attached to said base wall so as to rotatably support said hollow spindle; and a braking-member supporting member provided by being supported by said side wall of said main body housing so as to support said braking member at a predetermined position with respect to said stuffing nozzle.

33. The apparatus for manufacturing linked food products having twisted portions according to claim 31 or 32, wherein said base wall of said main body housing is provided in such a manner as to extend vertically.

34. The apparatus for manufacturing linked food products having twisted portions according to claim 27, wherein three pincher members are secured to each of said wrapping connector members.

* * * * *